(12) United States Patent
Hekal

(10) Patent No.: US 7,005,459 B2
(45) Date of Patent: *Feb. 28, 2006

(54) DESICCANT ENTRAINED POLYMER

(75) Inventor: Ihab M. Hekal, Stamford, CT (US)

(73) Assignee: CSP Technologies, Inc., Amsterdam, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/723,873

(22) Filed: Nov. 26, 2003

(65) Prior Publication Data

US 2004/0122175 A1 Jun. 24, 2004

Related U.S. Application Data

(60) Continuation of application No. 10/147,686, filed on May 16, 2002, now abandoned, which is a division of application No. 09/504,029, filed on Feb. 14, 2000, now Pat. No. 6,486,231, which is a continuation-in-part of application No. 09/156,937, filed on Sep. 18, 1998, now Pat. No. 6,194,079, which is a continuation-in-part of application No. 09/157,032, filed on Sep. 18, 1998, now Pat. No. 6,316,520, which is a continuation-in-part of application No. 09/157,014, filed on Sep. 18, 1998, now Pat. No. 6,177,183, which is a continuation-in-part of application No. 09/156,720, filed on Sep. 18, 1998, now Pat. No. 6,174,952, which is a continuation-in-part of application No. 09/087,830, filed on May 29, 1998, now Pat. No. 6,124,006, which is a continuation-in-part of application No. 08/812,315, filed on Mar. 5, 1997, now Pat. No. 6,130,263, which is a continuation-in-part of application No. 08/611,298, filed on Mar. 5, 1996, now Pat. No. 5,911,937.

(51) Int. Cl.
C08L 67/02 (2006.01)

(52) U.S. Cl. ............... 523/102; 523/122; 523/132; 521/905; 524/387; 524/503

(58) Field of Classification Search ............... 523/102, 523/122, 132; 521/905; 524/387, 503
See application file for complete search history.

(56) References Cited

U.S. PATENT DOCUMENTS

| | | | | |
|---|---|---|---|---|
| 3,375,208 A | * | 3/1968 | Duddy | 521/28 |
| 4,425,410 A | * | 1/1984 | Farrell et al. | 428/516 |
| 5,130,342 A | * | 7/1992 | McAllister et al. | 521/61 |
| 5,432,214 A | * | 7/1995 | Lancesseur | 524/12 |
| 5,494,155 A | * | 2/1996 | Evans et al. | 206/204 |
| 5,496,397 A | * | 3/1996 | Fischer et al. | 96/154 |

(Continued)

OTHER PUBLICATIONS

*Sud-Chemie, Inc. vs. CSP Technologies, Inc.*: "SCI'S Fifth Supplemental Objections and Responses to CSP'S First Set of Interrogatories Nos. 1-11", (pp. 1-70) (Attachment: "The Prior Art Invalidates The Asserted Claims") (p. 1-15).

(Continued)

*Primary Examiner*—Suzanne McDowell
(74) *Attorney, Agent, or Firm*—Greenberg Traurig

(57) ABSTRACT

The present invention includes a composition having a co-continuous interconnecting channel morphology. These co-continuous interconnecting channels are predominately occupied with a polymer and particles that control the percolation through the composition. The particles are composed of a material such as an absorbing agent, releasing agent and/or activation agent. The polymer composition may be used to form a desired shaped article such as plug type inserts and liners for closed containers, or it may be formed into a film, sheet, bead or pellet.

3 Claims, 28 Drawing Sheets

U.S. PATENT DOCUMENTS 5,518,761 A * 5/1996 Hatsuda et al. ............. 427/180
6,486,231 B1 * 11/2002 Hekal ......................... 523/102

OTHER PUBLICATIONS

*Sud-Chemie, Inc. vs. CSP Technologies, Inc.*: "CSP'S Supplemental Responses to SCI'S First Set of Interrogatories Nos. 1-4", (pp. 1-8) (Attachment: "Exhibit A" —Chart Comparing U.S. Patent No. 5,911,937, 6,124,006 and 6,214,255 to "SCI Infringing Product").
*Sud-Chemie, Inc. vs. CSP Technologies, Inc.*: "CSP'S Second Supplemental Responses to SCI'S First Set of Interrogatories Nos. 1-4", (pp. 1-14) (Attachment: "Exhibit A"-Letter From Kevin W. McCabe to Margaret M. Duncan, Esq., "Exhibit B"-Dictionary (p. 847), "Exhibit C"-Dictionary (p. 756) "Exhibit D"-Dictionary (p. 1305), "Exhibit E" (p. 1250), "Exhibit G"-Chart Comparing U.S. Patent No. 5,911,937, 6,124,006 and 6,214,255 to "SCI Infringing Product").
*Sud-Chemie, Inc. vs. CSP Technologies, Inc.*: "CSP'S Third Supplemental Responses to SCI'S First Set of Interrogatories Nos. 1-4", (pp. 1-18) (Attachment: "Exhibit A"-Letter From Kevin W. McCabe to Margaret M. Duncan, Esq., "Exhibit B"-Dictionary (p. 22), "Exhibit C"-Dictionary (p. 847) "Exhibit D"-Dictionary (p. 756), "Exhibit E"-Dictionary (p. 921), "Exhibit F"-Dictionary (p. 1305), "Exhibit G"-Dictionary (p. 1250), "Exhibit H"-Dictionary(p. 1251) "Exhibit I"-Chart Comparing U.S. Patent No. 5,911,937, 6,124,006 and 6,214,255 to "SCI Infringing Product").
*Sud-Chemie, Inc. vs. CSP Technologies, Inc.*: "CSP'S Fourth Supplemental Responses to SCI'S First Set of Interrogatories Nos. 1-4", (pp. 1-15) (Attachment: "Exhibit A"-Letter From Kevin W. McCabe to Margaret M. Duncan, Esq., "Exhibit B"-Dictionary (p. 22), "Exhibit C"-Dictionary(p. 847) "Exhibit D"-Dictionary (p. 756), "Exhibit E"-Dictionary (p. 921), "Exhibit F"-Dictionary (p. 1305), "Exhibit G"-Dictionary (p. 1250), "Exhibit H"-Dictionary(p. 1251) "Exhibit I",Chart Comparing U.S. Patent No. 5,911,937, 6,124,006 and 6,214,255 to "SCI Infringing Product").
*Sud-Chemie, Inc. vs. CSP Technologies, Inc.*: "CSP'S Objections and Responses to SCI'S Second Set of Interrogatories Nos. 5-6", (pp. 1-6).
*Sud-Chemie, Inc. vs. CSP Technologies, Inc.*: "CSP'S Supplemental Responses to SCI'S Second Set of Interrogatories Nos. 5 and 6", (pp. 1-5).
*Sud-Chemie, Inc. vs. CSP Technologies, Inc.*: "CSP'S Responses to SCI'S Third Set of Interrogatories Nos. 7-11", (pp. 1-9).
*Sud-Chemie, Inc. vs. CSP Technologies, Inc.*: "CSP'S Objections and Responses to SCI'S Fourth Set of Interrogatories" (pp. 1-8).
*Sud-Chemie, Inc. vs. CSP Technologies, Inc.*: CSP Technologies' First Supplemental Response to Interrogatory No. 5 (pp. 1-11).
*Sud-Chemie, Inc. vs. CSP Technologies, Inc.*: "CSP Technologies' Corrected First Supplemental Response to Interrogatory No. 5", (pp. 1-11).
*Sud-Chemie, Inc. vs. CSP Technologies, Inc.*: "CSP'S Answers to Plaintiff SCI'S First Set of Requests for Admission", (pp. 1-3) (Attachment: "CSP'S Objections And Responses to SCI'S Second Set of Requests For Admission" (pp. 1-4) with Attachment).
*Sud-Chemie, Inc. vs. CSP Technologies, Inc.*: "SCI'S Third Supplemental Objections and Responses to CSP'S First Set of Interrogatories Nos. 1-11", (pp. 1-63) (Attachment: "The Prior Art Invalidates The Asserted Claims") (pp. 1-13).
*Sud-Chemie, Inc. vs. CSP Technologies, Inc.*: "Complaint for Declaratory Judgment". (pp. 1-5).
*Sud-Chemie, Inc. vs. CSP Technologies, Inc.*: "Declaration of Robert S. Abrams in Support of CSP Technologies, Inc.'S Motion to Dismiss or Transfer Sud-Chemie's-Declaratory Judgment Action". (pp. 1-5) (Attachment: "Exhibit 1"-Letter From Klaus Langer to Robert S. Abrams, "Exhibit 2"-Letter From Robert S. Abrams Klaus Langer.
*Sud-Chemie, Inc. vs. CSP Technologies, Inc.*: "CSP Technologies, Inc.'s Memorandum of Points and Authorities in Support of its Motion to Dismiss or Transfer-Sud-Chemie's Declaratory Judgment Action", (pp. 1-23).
*Sud-Chemie, Inc. vs. CSP Technologies, Inc.*: "Sud-Chemie, Inc.'s First Amended Complaint", (pp. 1-7).
*Sud-Chemie, Inc. vs. CSP Technologies, Inc.*: "Consented to Motion for Leave to Withdraw the Defendants Motion to Dismiss or-Transfer", (pp. 1-3).
*Sud-Chemie, Inc. vs. CSP Technologies, Inc.*: "Answer and Counter Claims of Defendant and Counterclaim Plaintiff CSP Technologies, Inc.", (pp. 1-13).
*Sud-Chemie, Inc. vs. CSP Technologies, Inc.*: "Joint Proposed Case Management Plan", (pp. 1-21).
*Sud-Chemie, Inc. vs. CSP Technologies, Inc.*: Plaintiff Sud-Chemie, Inc.'s Reply to the Counterclaims of Defendant CSP Technologies, Inc., (pp. 1-6).
*Sud-Chemie, Inc. vs. CSP Technologies, Inc.*: "CSP's Motion for Leave to Amend Its Answer and Counterclaims", (pp. 1-8).
*Sud-Chemie, Inc. vs. CSP Technologies, Inc.*: "CSP Technologies' Motion to Dismiss Sud-Chemie's Declaratory Judgment Action for Lack of a Certain Controversy as to Certain-Patents and Products", (pp. 1-3).
*Sud-Chemie, Inc. vs. CSP Technologies, Inc.*: "CSP Technologies' Motion for Judgement on the Pleadings Dismissing Sud-Chemie's Amended Third Count for Inequitable Conbuct",- (pp. 1-6).
*Sud-Chemie, Inc. vs. CSP Technologies, Inc.*: "CSP Technologies' Memorandum in Support of its Motion to Dismiss Sud-Chemies Declaratory Judgment Action for Lack of a-Justiciable Controversy as to Certain Patents and Products", (pp. 1-15).
*Sud-Chemie, Inc. vs. CSP Technologies, Inc.*: "SCI's Opposition to CSP's Motion for Leave to Amend Its Answer and Counterclaims", (pp. 1-4).
*Sud-Chemie, Inc. vs. CSP Technologies, Inc.*: "SCI's Opposition to CSP's Motion for Judgment on the Pleadings" (pp. 1-12).
*Sud-Chemie, Inc. vs. CSP Technologies, Inc.*: "CSP's Opening Breif on Claim Construction", (pp. 1-30).
*Sud-Chemie, Inc. vs. CSP Technologies, Inc.*: "Plaintiff SCI's Breif on the Construction of the '937, '006, and '255 Patents", (pp. 1-29).
*Sud-Chemie, Inc. vs. CSP Technologies, Inc.*: CSP Technologies'Reply in Support of Its Motion for Leave to Amend Its Answer and Counterclaims, (pp. 1-4).
*Sud-Chemie, Inc. vs. CSP Technologies, Inc.*: "CSP Technologies' Reply in Support of Its Motion for Judgment on the Pleadings Dismissing Sud-Chemie's Amended Third-Count for Inequitable Conduct", (pp. 1-9).
*Sud-Chemie, Inc. vs. CSP Technologies, Inc.*: CSP Technologies' Reply in Support of Its Motion to Dismiss Sud- Chemie's Declaratory Judgment Action as to Certain Patents and-Products, (pp. 1-15).

Sud-Chemie, Inc. vs. CSP Technologies, Inc.: "SCI's Opposition to CSP's Reply in Support of Its Motion for Leave to Amend Its Answer and Counterclaims", (pp. 1-8).

Sud-Chemie, Inc. vs. CSP Technologies, Inc.: "Plaintiff SCI's Reply Breif on the Construction of the '937, '006, and '255 Patents", (pp. 1-22).

Sud-Chemie, Inc. vs. CSP Technologies, Inc.: "CSP's Response to SCI's Breif on Claim Construction", (pp. 1-36).

Sud-Chemie, Inc. vs. CSP Technologies, Inc.: "Plaintiff's Motion for Summary Judgment of No Literal Infringement", (pp. 1-12).

Sud-Chemie, Inc. vs. CSP Technologies, Inc.: "Plaintiff SCI's Breif in Support of Its Motion for Summary Judgment of no Literal Infringement", (pp. 1-12).

Sud-Chemie, Inc. vs. CSP Technologies, Inc.: "Official Reporter's Transcript of Markman Hearing", (pp. 1-106).

Sud-Chemie, Inc. vs. CSP Technologies, Inc.: "CSP Technologies' Breif in Opposition to SCI's Motion for Summary Judgment of No Literal Infringement", (pp. 1-18).

Sud-Chemie, Inc. vs. CSP Technologies, Inc.: "Declaration of Christopher W. Macosko", (pp. 1-8).

Sud-Chemie, Inc. vs. CSP Technologies, Inc.: "Second Declaration of Christopher W. Macosko", (pp. 1-6).

Sud-Chemie, Inc. vs. CSP Technologies, Inc.: SCI's Reply to Sur-Reply Breif Regarding SCI's Motion for Summary Judgment of No Literal Infringement, (pp. 1-5).

Sud-Chemie, Inc. vs. CSP Technologies, Inc.: "CSP's Motion to Dismiss All Claims Relating to U.S. Patent No. 6,124,006 for Lack of a Justiciable Controversy", (pp. 1-3).

Sud-Chemie, Inc. vs. CSP Technologies, Inc.: CSP's Memorandum in Support of Its Motion to Dismiss All Claims Relating to U.S. Patent No. 6,124,006 for Lack of a Justicable-Controversy (pp. 1-4).

Sud-Chemie, Inc. vs. CSP Technologies, Inc.: "SCI's Opposition to Dismiss All Claims Relating to U.S. Patent No. 6,124,006 for Lack of a Justiciable Controversy and SCI's-Cross-Motion in Limine Regarding the Presumtion of Validity", (pp. 1-11).

Sud-Chemie, Inc. vs. CSP Technologies, Inc.: "CSP' Reply in Support of Its Motion to Dismiss All Claims Relating to U.S. Patent No. 6,124,006 for Lack of a Justiciable-Controversy and CSP's Opposition To SCI's Cross-Motion in Limine Regarding the Presumtion of Validity", (pp. 1-13).

Sud-Chemie, Inc. vs. CSP Technologies, Inc.: "SCI's Reply in Suport of Its Motion for Summary Judgment of No Literal Infringement", (pp. 1-21.

Sud-Chemie, Inc. vs. CSP Technologies, Inc.: "CSP Technologies' Surreply in Opposition to SCI's Motion for Summary Judgment of No Literal Infringement", (p. 1-17).

Sud-Chemie, Inc. vs. CSP Technologies, Inc.: SCI's Memorandum of Law in Support of Its Motion for Summary Judgment of Patent Invalidity, (pp. 1-35) (With Attachment Cited Below).

(Attachment No. 1: Sud-Chemie, Inc. Vs. CSP Technologies, Inc.: "CSP's Fourth Supplemental Responses to SCI's First Set-Of Interrogatories Nos. 1-4") (pp. 1-15) With Attachment).

(Attachment No. 2: Hekal, "United States Patent No. 5,911, 937").

(Attachment No. 3: Hekal, "United States Patent No. 6,124, 006").

(Attachment No. 4: Sud-Chemie, Inc. Vs. CSP Technologies, Inc.: "CSP's Answers To Plaintiff SCI's First Set of Requests For Admission", (pp. 1-4).

(Attachment No. 5: Sud-Chemie, Inc. Vs. CSP Technologies, Inc.: "CSP's Responses to SCI's Third Set of Interrogatories Nos. 7-11", (pp. 1-9).

(Attachment No. 6: Sud-Chemie, Inc. vs. CSP Technologies, Inc.: "Declaration of Professor Donald R. Paul In Support of SCI's Motion For Summary Judgment Of-Patent Invalidity", (pp. 1-6).

(Attachment No. 7: Sud-Chemie, Inc. vs. CSP Technologies, Inc.: "Deposition Transcript of Ihab Hekal" (Sep. 24, 2004) (7 pages).

(Attachment No. 8: "Hekal, United States Patent No. 6,130, 263").

(Attachment No. 9: "Hekal, United States Patent No. 6,214, 255 B1").

(Attachment No. 10: Sud-Chemie, Inc. vs. CSP Technologies, Inc.: "Deposition of Glenn Frederickson Taken on Tuesday, Oct. 12, 2004", (19 pages).

(Attachment No. 11: Sud-Chemie, Inc. vs. CSP Technologies, Inc.: "Videotaped Deposition of Defendant by Ihab Hekal", (Sep. 23, 2004) (7 pages).

(Attachment No. 12: Lancessenr, "United States Patent No. 5,432,214").

(Attachment No. 13: "Chart Comparing U.S. Patent No. 5,911,937, 6,124.006 and 6,214,255 to SCI Infringing Product", (pp. 1-5).

(Attachment No. 14: "Project on Morphology Control In Polymer-Polymer-Particle Alloys", (pp. 1-2).

(Attachment No. 15: "European Patent Application No. 0,401,666 A2").

(Attachment No. 16: "Shigeta et al., United States patent No. 5,078,909").

(Attachment No. 17: "International Application No. PCT/US96/05261").

(Attachment No. 18: "Hekal, United States Patent No. 6,174,952 B1").

(Attachment No. 19: "Hekal, United States Patent No. 6,194,079 B1").

(Attachment No. 20: "Hekal, United States Patent No. 6,465,532 B1").

(Attachment No. 21: "Hekal, United States Patent No. 6,486,231 B1").

(Attachment No. 22: "Memo To Dr.Hekal From Rob Garren").

(Attachment No. 23: Sud-Chemie, Inc. Vs. CSP Technologies, Inc.: "Deposition of Robert Garren, on Jul. 8, 2004", (4 pages).

(Attachment No. 24: "Letter to Calvin L. Loop From Robert S. Abrams"), With Attachment.

(Attachment No. 25: "Letter to Calvin L. Loop From Robert S. Abrams").

(Attachment No. 26: "Memo To Calvin Loop From Rob Garren").

(Attachment No. 27: "Memo To Calvin Loop From Beki Urioste" ).

(Attachment No. 28: "Memo To Dr. Hekal, Clavin Loop, Robert Abrams From Rob Garren").

(Attachment No. 29: "Summary on New Polymer Technology").

(Attachment No. 30: "Diagrams").

(Attachment No. 31: "Diagrams").

(Attachment No. 32: "Diagrams").

*Sud-Chemie, Inc. vs. CSP Technologies, Inc.*: "CSP Technologies Inc.'s Opposition to Sud-Chemie, Inc.'s Summary Judgment Motion and Exhibits 7, 9A, 9B, 9C,9D,9E, 12,14,15 & 17", (pp. 1-34).

*Sud-Chemie, Inc. vs. CSP Technologies, Inc.*: "SCI's Reply Brief in Support of Its Motion for Summary Judgment of Patent Invalidity", (pp. 1-21).

*Sud-Chemie, Inc. vs. CSP Technologies, Inc.*: "CSP's Local Rule 56.1(d) Surreply in Opposition to SCI's Motion for Summary Judgment of Patent Invalidity", (pp. 1-10).

*Sud-Chemie, Inc. vs. CSP Technologies, Inc.*: "SCI's Motion for Summary Judgment of Patent Invalidity", (pp. 1-2).

* cited by examiner

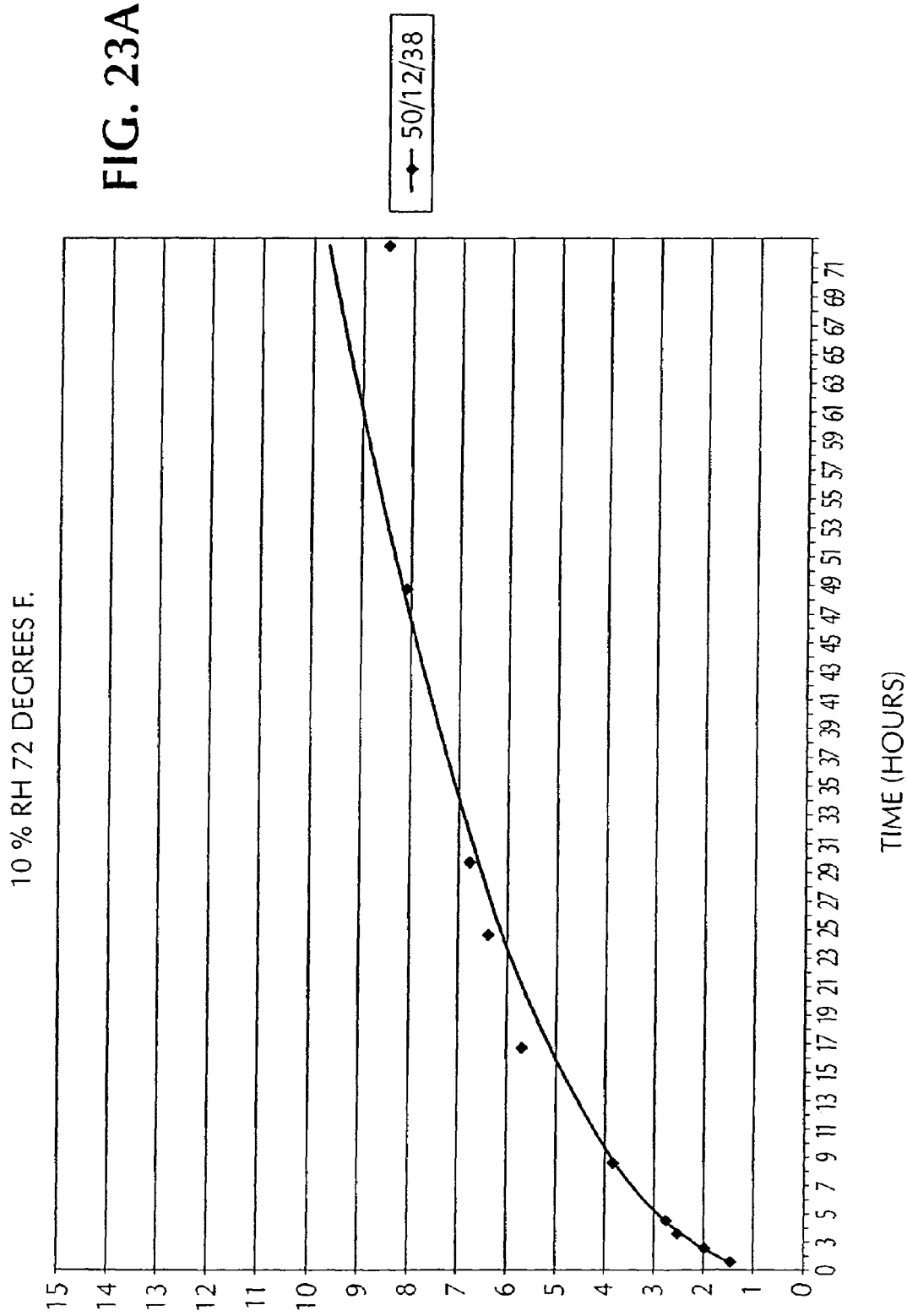

US 7,005,459 B2

DESICCANT ENTRAINED POLYMER

RELATED APPLICATION

This application is a continuation of U.S. Ser. No. 10/147,686, filed May 16, 2002 now abandoned, which is a divisional of U.S. Ser. No. 09/504,029, filed Feb. 14, 2000 now U.S. Pat. No. 6,486,231, which is a continuation-in-part of U.S. Ser. No. 09/156,937 now U.S. Pat. No. 6,194,079, Ser. No. 09/157,032 now U.S. Pat. No. 6,316,520, Ser. No. 09/157,014 now U.S. Pat. No. 6,177,183 and Ser. No. 09/156,720 now U.S. Pat. No. 6,174,952, filed Sep. 18, 1998, which in turn is a continuation-in-part of U.S. Ser. No. 09/087,830, filed May 29, 1998 now U.S. Pat. No. 6,124,006, which in turn is a continuation-in-part of U.S. Ser. No. 08/812,315, filed Mar. 5, 1997 now U.S. Pat. No. 6,130,263, which in turn is a continuation-in-part of U.S. Ser. No. 08/611,298, filed on Mar. 5, 1996, now U.S. Pat. No. 5,911,937.

FIELD OF THE INVENTION

This invention generally relates to a composition having co-continuous interconnecting channel morphology comprising three components—two polymers (i.e. components A and B) and a particle (i.e. component C) wherein the channels consist mainly of component B and the majority of component C resides in the channels. Components A and B are generally immiscible within each other. In addition, one criteria for selecting component C and components A and B may be based on component C preferential affinity for component B over component A. Another criteria for selecting component C may be based on the capacity of component C to absorb and/or release a desired substance. For example, component C may be an absorbing material such as desiccant. In one embodiment, the composition of the present invention is useful in the manufacture of shaped articles such as containers and packaging for items requiring controlled environments.

BACKGROUND OF THE INVENTION

There are many items that are preferably stored, shipped and/or utilized in an environment that must be controlled and/or regulated. For example, in the moisture control area, containers and/or packages having the ability to absorb excess moisture trapped therein have been recognized as desirable. One application in which moisture absorbing containers are desired is for the shipment and storage of medications whose efficacy is compromised by moisture. The initial placement of medicines into a sealed moisture free container is usually controllable. Furthermore, the container for the medicine is selected so that is has a low permeability to moisture. Therefore, the medication will normally be protected from moisture until it reaches the end user. Once the medicine is received by the customer, however, the container must be repeatedly opened and closed to access the medication. Each time the container is opened and unsealed, moisture bearing air will most likely be introduced into the container and sealed therein upon closure. Unless this moisture is otherwise removed from the atmosphere or head space of the container, it may be detrimentally absorbed by the medication. For this reason, it is a well known practice to include a desiccating unit together with the medication in the container.

Other items, electronic components may require reduced moisture conditions for optimal performance. These components may be sealed in containers, but excess moisture that is initially trapped therein must be removed. Furthermore, the housings may not be completely moisture tight, and moisture may be allowed to seep into the container. This moisture must also be retained away from the working components. For these reasons, it is important to include a desiccating agent within the housing for absorbing and retaining excess moisture. Because of the delicacy of many of the components that are to be protected from the moisture, it is important that the desiccant used not be of a "dusting" nature that may contaminate and compromise the performance of the components. Therefore, it has been recognized as advantageous to expose a desiccating agent to the interior space of such containers, while at the same time shielding the working components from actual contact with the desiccating material, including desiccant dust that may be produced therefrom.

In other instances, moisture may be released from items that have been placed in containers or sealed in packaging wrap for shipping and/or storage. Prime examples of such items are food stuffs-that release moisture during shipping and storage. In the instance of containers that are sealed and substantially impermeable to moisture, the released moisture will remain within the container. If not removed, this released moisture may have ill effects on the very item that released the moisture. It has been found that a substantial amount of moisture is released from certain food products within the first forty-eight (48) hours after manufacture and packaging. This released moisture will remain until removed. If the moisture is not removed shortly after its release, it may cause the food to degrade into a condition that is not saleable. In these cases, desiccants may be included together with the contained items to continually absorb the released moisture until the product is unpacked. In this way, a relatively dry environment is maintained about the stored item.

SUMMARY OF THE INVENTION

The present invention discloses a composition having co-continuous interconnecting channel morphology. In one embodiment, these co-continuous interconnecting channels communicate the particle, which is predominately residing in the channels, to the appropriate areas of the exterior of the composition in a manner that permits the desired property (e.g., gases and vapors) to migrate from either outside the composition to interior locations where the particle is positioned or from the interior locations where the particle is positioned to the environment. Furthermore, these co-continuous interconnecting channels through which the desired property is permitted to travel are occupied by a polymer (e.g., hydrophilic agents) that control the percolation through the composition. This polymer is drawn out into interconnected channels that contain a percolation path.

BRIEF DESCRIPTION OF DRAWINGS

FIGS. 23a and 23b is a graphical view of showing the percent moisture gain per weight of molecular sieve at 10% Rh and 72 F and 20% RH and 72 F, respectively.

Figure 1:
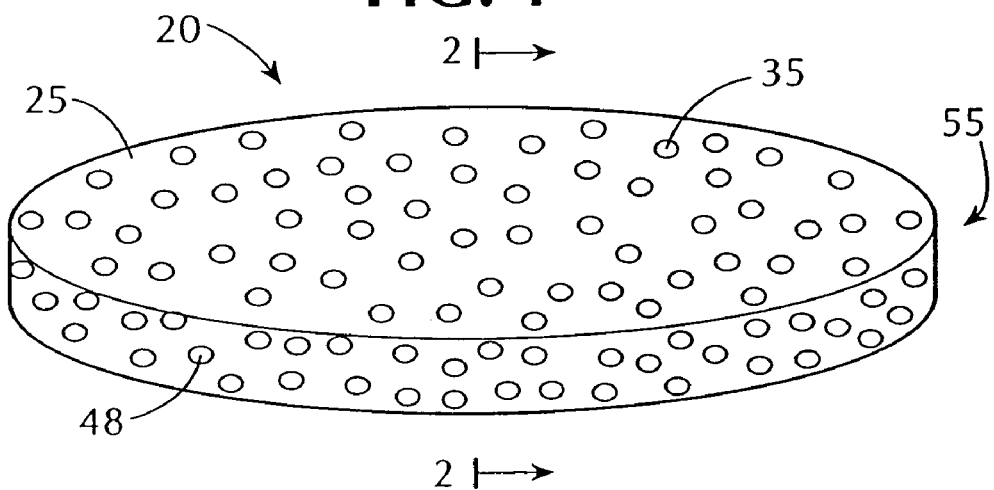
FIG. 1 is a perspective view of a plug, insert, or tablet constructed from the composition of the present invention showing, in an exaggerated scale, the openings of the co-continuous interconnecting channels morphology at the exterior surface of the plug.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

It has been discovered that a composition having co-continuous interconnecting channel morphology may be produced and that such a composition may be used in the formation of shaped articles such as containers, sheets, films, pellets, beads and discs. Specifically, a composition having co-continuous interconnecting channel morphology may be formed comprising at least three components, wherein: (a) component A is selected from the group of polymers that are semicrystalline polymers and amorphous polymers, wherein the amorphous polymers have a shear modulus greater than about 8 MPa; (b) component B is a polymer; (c) components A and B are immiscible within each other, and if components A and B react after mixing, components A and B are immiscible prior to reacting; (d) component C is a particle; (e) the volume fraction of component A represents at least about 50% by volume of the total volume of components A, B and C; (f) the preferential affinity between component B and component C is greater than between component A and component C; (g) at least two phases are formed, one phase is composed of a majority of component A, and the second phase is composed of a majority of components B and a majority of component C; and (h) two phases form the co-continuous interconnecting channel morphology.

Components A, B and C may be selected based on the desired end-use result—the desired end-use property. For example, component A may typically be selected based on its permeability properties (e.g. barrier properties), its chemical and/or temperature resistance properties, its molding properties, and/or its price (e.g. since it is the component having the largest volume fraction of the composition). Similarly, for example, component B may typically be selected based on its transport properties (e.g. desired vapor or gas) and/or its preferential affinity with component C. Also, for example, component C may typically be selected based on its ability to absorb, release and/or activate the desired end-use material (e.g. vapor or gas). Consequently, a specific composition may be uniquely tailored and thus, uniquely optimized for a desired end-use application.

In one embodiment, component B may be a hydrophilic agent. In a further embodiment, component C (i.e., the particle) may be an absorbing material. In another embodiment, component C may be a releasing material. In a further embodiment, component C may be an activation material. In yet another embodiment, component C may be both an absorbing and a releasing material.

For example, one method of forming the composition of the present invention is by adding component C and component B to component A, which in one example is a water-insoluble polymer, when component A is in a molten state; or before component A is in the molten state, so that components B and C may be blended and thoroughly mixed throughout component A to insure that the blend is uniformly mixed before reaching the melt phase. For example, such a technique may be useful when components A, B and C are all powders. In another embodiment, component B (such as a hydrophilic agent) and component A are mixed prior to adding component C. Component B is either added before component A is in the molten state or after component A is in the molten state. For example, component C may be added to component A during the thermal process of forming sheets. After blending and processing, component B is drawn out into interconnecting channels that contain a percolation path in component A. The majority of component C resides in the interconnecting channels because of its preferential affinity towards component B over component A. In addition, the composition of the present invention may be described as "monolithic" because the composition does not consist of two or more discrete macroscopic layers.

For purposes of the present invention, the term "phase" means a portion of a physical system that is uniform throughout, has defined boundaries and, in principle, can be separated physically from other phases. The term "water-insoluble polymer" means a polymer having a solubility in water below about 0.1% at 25° C. and atmospheric pressure. The term "hydrophilic agent" is defined as a material that is not cross-linked and that has a solubility in water of at least about 1% at 25° C. and atmospheric pressure. Suitable hydrophilic agents include "channeling" agents. The term "melting point" is defined as the first order transition point of the material determined by DSC. The term "not mutually soluble" means immiscible with each other. The term "immiscibility" means that the components of the blend are driven by thermodynamic forces to separate (i.e. demix) into two or more distinct phases that will coexist indefinitely under equilibrium conditions. An example is the separation of the oil-rich and water-rich phases in a salad dressing. For purposes of the present invention, "partial" immiscibility or "partial" miscibility is deemed "immiscible" and thus, any tendency for a component to phase separate from another component is deemed "immiscible." Immiscibility may be determined by the application of one or more forms of microscopy (e.g., optical, TEM, SEM or AFM) with an observation that the components are separated into two or more distinct phases. The term "particle" means a dispersed component that is either a crystalline or amorphous solid, or a crosslinked organic or inorganic material, and that retains its shape, aside from recoverable deformations, before, during, and after the blend is compounded in the molten state at elevated temperatures. This would include, e.g., a crosslinked polymer latex.

Further, for purposes of the present invention, the term "co-continuous interconnecting channel morphology" means that the minor phase (i.e., component B) is drawn out into interconnected channels that contain a percolation path, while simultaneously, the majority phase (i.e., component A) is percolating. "Percolation" means that there exists at least one unbroken path, composed only of points from within that phase, that will lead from any surface of a sample through the interior of the sample to any other surface. Such a percolation path provides a route for a desired object, such as a small molecule, an atom, an ion, or an electron, to be macroscopically transported across the sample while contacting only one of the phases. For some systems, the existence of an interconnecting channel morphology that is co-continuous may be determined by a minimum of two transport measurements that demonstrate percolation in both minor and major phases. Percolation theory is a mature branch of mathematics and physical science that is described in a variety of review articles, specialized monographs, and many introductory texts on stochastic processes, probability theory, and statistical mechanics. For example, an introductory treatment of percolation theory is described by D. Stauffer in *Introduction to Percolation Theory*, Taylor and Francis, (London 1985).

The term "preferential affinity" means that the particle (i.e., component C) has a lower interfacial energy when contacting one component than compared to contacting another component. A suitable method for determining "preferential affinity" for the present invention is the following:

(a) Blend the particle with the two components at elevated temperatures in their liquid state. Mix to achieve a macroscopically homogeneous dispersion.
(b) Cool the mixture and allow to solidify.
(c) Use a form of microscopy (e.g., TEM, SEM, and/or AFM) on a thin section to determine which of the two phases most closely contacts each particle in the field of view.
(d) The component that is in the majority in the phase that contacts the largest number of particles is the component with "preferential affinity" for the particle.

Further, the term "shear modulus" is the ratio of a measured shear stress to the magnitude of a small, elastically recoverable, shear strain that is used to produce that stress. The criterion of greater than about 8 MPa refers to the shear modulus measured at room temperature. The "shear modulus" is determined by ASTM test method E143-87 (1998). The term "polymer" means a composition that is made by reacting two or more molecular species ("monomers") to form chemically-bonded larger molecules. The term "semi-crystalline" means that the polymeric component, at ambient temperature, contains regions in which chain segments are packed with spatial registry into a periodic lattice and these regions are of sufficient size and extent to exhibit a detectable melting endotherm in a differential scanning calorimetry (DSC) measurement. The term "amorphous" means that the polymeric component, at ambient temperature, either contains no regions of periodic packing of segments, or such regions are undetectable with a DSC measurement.

In one embodiment, component B may be a hydrophilic agent. Suitable hydrophilic agents of the present invention may include polyglycols such as poly(ethylene glycol) and poly(propylene glycol) and mixtures thereof. Other suitable materials may include EVOH, pentaerithritol, PVOH, polyvinylpyrollidine, vinylpyrollidone or poly(N-methyl pyrollidone), and saccharide based compounds such as glucose, fructose, and their alcohols, mannitol, dextrin, and hydrolized starch being suitable for the purposes of the present invention since they are hydrophilic compounds.

In another embodiment, suitable hydrophilic agents of the present invention may also include any hydrophilic material wherein, during processing, the hydrophilic agent is heated above its melt point upon melt mixing, and subsequently upon cooling separates from the polymer to form the interconnecting channeled structure of the present invention and a three phase system of a water-insoluble polymer, hydrophilic agent and an absorbing material.

In one embodiment, the particle (i.e., component C) may be composed of one or more type of absorbing materials. For example, absorbing material of the present invention may include one or more desiccating compounds. In general, there are three primary types of desiccating compounds that may be used with the present invention. The first type comprises chemical compounds that can combine with water to form hydrates. Examples of such desiccant are anhydrous salts which tend to absorb water or moisture and form a stable hydrate. In this reaction with the moisture, a stable compound is formed within which the moisture is held and prevented from release by chemical interaction.

The second type of desiccant compounds are those which are considered to be reactive. These compounds typically undergo a chemical reaction with water or moisture and form new compounds within which the water is combined. These newly formed compounds are generally irreversible at low temperature and require a significant amount of energy to be regenerated so that they may be reused as a desiccant. These reactive type desiccants are mainly used in solvent drying and as water-absorbing materials to polymers which must themselves be maintained in a moisture reduced state The third type of desiccants obtain their moisture absorbing capabilities through physical absorption. The absorption process is accomplished because of a fine capillary morphology of the desiccant particles which pulls moisture therethrough. The pore size of the capillaries, as well as the capillaries' density determine the absorption properties of the desiccant. Examples of these physical absorption desiccants include molecular sieves, silica gels, clays (e.g. montmorillimite clay), certain synthetic polymers (e.g. those used in baby diapers), and starches. Because these types of physical absorption desiccants are both inert and non-water soluble, they are preferred for many applications. In one embodiment, the molecular sieve pore sizes that are suitable for use in the present invention include between about 3 to 15 Angstroms; about 3 to 5 Angstroms, about 5 to 8:3 Angstroms; 4 Angstroms; 5 Angstroms; 8 Angstroms and 10 Angstroms. In another embodiment, the pore size of silica gel is about 24 Angstroms. Among other reasons, these innocuous characteristics are particularly compatible with food products and medicinal products that may be enclosed within containers formed from the desiccant entrained polymers, or at least exposed thereto. As stated previously, however, any of the three types may be employed within the polymers of the present invention for the purposes of producing a desiccant entrained polymer.

In another embodiment, component C may be composed of absorbing materials such as: (1) metals and alloys such as, but not limited to, nickel, copper, aluminum, silicon, solder, silver, gold; (2) metal-plated particulate such as silver-plated copper, silver-placed nickel, silver-plated glass microspheres; (3) inorganics such as $BaTiO_3$, $SrTiO_3$, $SiO_2$, $Al_2O_3$, $ZnO$, $TiO_2$, $MnO$, $CuO$, $Sb_2O_3$, WC, fused silica, fumed silica, amorphous fused silica, sol-gel silica, sol-gel titanates, mixed titanates, ion exchange resins, lithium-containing ceramics, hollow glass microspheres; (4) carbon-based materials such as carbon, activated charcoal, carbon black, ketchem black, diamond powder; and (5) elastomers, such as polybutadiene, polysiloxane, and semi-metals, ceramic.

In another example, the absorbing material may be calcium oxide. In the presence of moisture and carbon dioxide, the calcium oxide is converted to calcium carbonate. Accordingly, calcium oxide may be used as the absorbing material in application where absorption of carbon dioxide is needed. Such applications include preserving fresh foods (e.g. fruits and vegetables) that give off carbon dioxide.

It is believed that the higher the absorbing material concentration in the mixture, the greater the absorption capacity will be of the final composition. However, the higher absorbing material concentration should cause the body to be more brittle and the mixture to be more difficult to either thermally form, extrude or injection mold. In one embodiment, the absorbing material loading level can range from 10% to 20%, 20% to 40% and 40% to 60% by weight with respect to the polymer.

In another embodiment, for example, the composition of the present invention may include a desiccant such as molecular sieves (i.e. component C), polypropylene (i.e. component A) and polyglycol (i.e. component B). The amounts of the various components would be for example, from about 30–80 wt %, or from about 40–70 wt % of the desiccant, or about 60 wt %; from about 20–40 wt % of the polypropylene, e.g. polypropylene homopolymer available from Exxon [3505], having a melt flow of 400, or about 30 wt %; and from about 5–20 wt % of the polyglycol, e.g., poly[ethylene propylene glycol] available from Dow (15–200), or about 10 wt %.

In yet another embodiment, the particle (i.e. component C) may be composed of a variety of releasing material. Such material may comprise any suitable form which will release dispersant to surrounding atmosphere, including solid, gel, liquid, and in some cases a gas. These substances can perform a variety of functions including: serving as a fragrance, flavor, or perfume source; supplying a biologically active ingredient such as pesticide, pest repellent, antimicrobials, bait, aromatic medicines, etc.; providing humidifying or desiccating substances; delivering air-borne active chemicals, such as corrosion inhibitors; ripening agents and odor-making agents, etc. For example, component C may be a particle having biocide properties. Such biocides may include, but are not limited to, pesticides, herbicides, nematacides, fungicides, rodenticides and/or mixtures thereof.

Other releasing materials include fragrances, including natural, essential oils and synthetic perfumes, and blends thereof. Typical perfumery materials which may form part of, or possible the whole of, the active ingredient include: natural essential oils such as lemon oil, mandarin oil, clove leaf oil, petitgrain oil, cedar wood oil, patchouli oil, lavandin oil, neroli oil, ylang oil, rose absolute or jasmin absolute; natural resins such as labdanum resin or olibanum resin; single perfumery chemicals which may be isolated from natural sources of manufactured synthetically, as for example alcohols such as geraniol, nerol, citronellol, linalol, tetrahydrogeraniol, betaphenylethyl alcohol, methyl phenyl carbinol, dimethyl benzyl carbinol, menthol or cedrol; acetates and other esters derived form such alcohols-aldehydes such as citral, citronellal, hydroxycitronellal, lauric aldehyde, undecylenic aldehyde, cinnamaldehyde, amyl cinnamic aldehyde, vanillin or heliotropin; acetals derived from such aldehydes; ketones such as methyl hexyl ketone, the ionones and methylionones; phenolic compounds such as eugenol and isoeugenol; synthetic musks such as musk xylene, musk ketone and ethylene brassylate.

In yet another embodiment, the particle (i.e. component C) may be composed of various types of activation material. Generally, an activation material includes a composition that requires a specific liquid, vapor, or gas to activate the composition and, after activation, the composition releases the desired vapor, liquid, or gas. In one embodiment, moisture is used to activate the composition. In another embodiment, oxygen is used to activate the composition. In a further embodiment, an acid is used to activate the composition. In yet a further embodiment, a base is used to activate the composition. In yet another embodiment, a variety of materials may be released. Such material may comprise any suitable form which will release dispersant to surrounding atmosphere, including solid, gel, liquid, and, in some cases, a gas. These substances can perform a variety of functions, including: serving as a fragrance or perfume source; supplying a biologically active ingredient such as a biocide, antimicrobial agent, pesticide, pest repellent, bait, aromatic medicine, etc.; providing humidifying or desiccating substances; or delivering air-borne active chemicals, such as corrosion inhibitors, ripening agents and odor-masking agents.

It is to be understood that two or more materials may be added with one functioning as an absorbing material and the other then functioning as a releasing material to form an activation material. An example would be a desiccant (i.e. absorbing) and a releasing material such as a dispersant.

Another example of activation materials are enzyme systems. Suitable enzyme systems may include glucose oxidase; a glucose/glucose oxidase combination; a glucose oxidase/sucrose combination; a starch/amylase/glucose oxidase combination; a cellulose/cellulase/glucose oxidase combination; a milk powder/lactase/glucose oxidase combination; a glucose oxidase/glucose isomerase/fructose combination; a glucose oxidase/lactase/whey solids/lactose combination; a glucose oxidase/lactase/lactose combination; a glucose oxidase/maltase/starch combination; a glucose oxidase/maltase/maltose combination; a mushroom tyrosinase/tyrosine combination; a glucose oxidase/sucrose/sucrase combination; an alcohol/alcohol oxidase; a lactate/lactate oxidase; an amino acid/amino acid oxidase; a golactose/golactose oxidase; a xanthine/xanthine oxidase; an amine/amine oxidase; an ascorbate/ascorbate oxidase; a chelione/chelione oxidase; and any combination of these enzymes.

In yet another embodiment of activation material, some catalyzed reactions may generate hydrogen peroxide as a byproduct. The released hydrogen peroxide may be of some benefit to extend shelf life of meats, poultry and fish if the hydrogen peroxide is in direct contact with the wet surfaces of those foods. Alternatively, concern about the generation of hydrogen peroxide may be minimized by including catalase in the enzyme system.

In a further embodiment, activation material may also be added to provide the polymer with one or more specific properties, such as acidity, basicity, thermal conductivity, electrical conductivity, dimensional stability, low dielectric constant, high-dielectric constant, ion-exchange capabilities, galvanic potential, flame retardency, etc.

It is believed that the higher the activation material concentration in the mixture, the greater the capacity will be of the final composition. However, the higher activation material concentration should cause the body to be more brittle and the mixture to be more difficult to either thermally form, extrude or injection mold. In one embodiment, the activation material loading level can range from 10% to 20%, 20% to 40% and 40% to 60% by weight with respect to the polymer.

With respect to component A, in one embodiment, component A may be a water-insoluble polymer such as a thermoplastic material. Examples of suitable thermoplastic materials may include polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly (vinyl chloride), polystyrene, polyesters, polyanhydrides, polyacrylianitrile, polysulfones, polyacrylic ester, acrylic, polyurethane and polyacetal, or copolymers or mixtures thereof.

In an additional embodiment, component B may be a hydrophobic agent. For purposes of the present invention, the term "hydrophobic agent" is defined as a material that has a solubility in water of less than about 20% at 25\C and atmospheric pressure. In one example, hydrophobic agents may be used in applications requiring the absorption of non-polar gases. For example, a water-insoluble polymer (e.g. component A), a hydrophobic agent (e.g. component B) and an absorbing material (e.g. component C) of the present invention may be used in application where removal of toxic gases and/or organic solvents are required such as in filter systems. It is understood that, in some cases, the use of a hydrophobic agent in combination with the water-insoluble polymer and absorbing material may result in a two phase system.

In yet another embodiment, components A, B and C are first dry mixed in a mixer such as a Henschel, and then fed to a compounder. A Leistritz twin screw extruder, for example, or a Werner Pfleider mixer can be used to achieve a good melt mix at about 140° C. to about 170° C. The melt can then be either extruded to form, for example, a film or converted into pellets using dry air cooling on a vibrating conveyer. The formed pellets, containing channels, can, for example, then be either injection molded into beads, sieves, or co-injected with polypropylene as the inside layer of a container.

Moreover, in a further embodiment, it is believed that a composition may be formed having channels composed of two discrete polymers (e.g. components B and B') with each type of channel composed of a majority of either the same particles (e.g. component C) or different particles (e.g. components C and C') where B/B' and C/C' are selected, among other characteristics, based on their preferential affinities with each other. For example, a composition may be formed, wherein: (a) component A is a semicrystalline polymer; (b) component B and B' are polymers; (c) components A, B and B' are immiscible within each other; (d) components C and C' are particles; (e) the volume fraction of component A represents at least about 34% by volume of the total volume of components A, B, B', C and C'; (f) the preferential affinity between components B and C is greater than either between components A and C and between components B' and C; (g) the preferential affinity between components B' and C' is greater than either between components A and C' and between components B and C'; (h) at least three phases are formed, one phase is composed of a majority of component A, the second phase is composed of a majority of component B and a majority of component C, and the third phase is composed of a majority of components B' and a majority of components C'; and (i) at least three phases form the co-continuous interconnecting channel morphology. It is further believed that such a composition could be designed to have multiple characteristics. For example, a select channel morphology could have high moisture transmission properties with a majority of desiccants residing in these channels and another channel morphology within the same composition could have high oxygen transmission properties with oxygen absorbing agents. In addition, as another example, additional channel morphology may also be designed using additional components (e.g. components B", B''', . . . and C", C''' . . . ).

In yet a further embodiment, because the composition of the present invention may typically be more brittle than component A without components B and C, the package may be molded so that an interior portion of the package is the composition of the present invention while the exterior portions are formed from pure polymer or the composition of the present invention with a lower loading level components B and/or C. For example, a package having an interior portion composed of the composition of the present invention and an exterior portion composed of pure polymer typically will not only be more durable and less brittle, but it will also act as a gas barrier that resists the transmission of the vapor from the exterior into the interior of the package. In this manner, the absorption and/or releasing capacity of component C is potentiated by exposing it exclusively to the interior of the package from which it is desired that the vapor be withdrawn and retained therefrom.

The composition of the present invention has numerous applications. The following examples are merely exemplary and are not meant to limit the application of the present invention. One application is the construction of rigid containers that are suitable for containing relatively small volumes of product such as food stuffs and medicines. In many cases, these types of products must be shipped and stored in controlled environments (e.g. reduced moisture and/or oxygen). In another embodiment, the composition of the present invention may be formed into an insert for inclusion within the interior of the container. An example of one form of an insert is a plug or sleeve of any suitable shape. While the plug would serve its purpose by being merely deposited within the container, it may also be fixed to an interior location so that it does move about within the interior space. In a further embodiment, it is anticipated that a plug formed into a disc may be shaped and sized to be pressed fit into the bottom of a polymer formed container.

In another embodiment, a liner may be formed from the composition of the present invention that has an exterior surface substantially conforming to an interior surface of the container body. Like the disc, the liner may be sized so that it may be press-fit into position within the polymer body where it is held sufficiently snugly to prevent its unintended disengagement therefrom. Alternatively, in a further embodiment, either the plug or liner may be initially constructed and allowed to harden, and then the container body subsequently constructed thereabout so that the greater shrinkage characteristics of the polymer body not containing absorbing material tightly shrink-fits the container body about the plug or liner so that neither becomes easily disengaged from the other. In still a further embodiment, the insert taking the form of either a plug or a liner may be substantially simultaneously comolded with the polymer container body so that each is integrally joined with the other. In the event of a co-molding process, the viscosities of the absorbing laden insert and the polymer container body should typically be approximately equal to facilitate the proper and desired location of the two phases of liquid or molten material that are molded together.

In yet another embodiment, composition of the present invention may be used to form sheeting that is joined with another sheet. In at least one embodiment, the sheets are effectively laminated one to the other so that an exterior layer may be established adjacent to the composition of the present invention which is substantially gas impermeable. The laminate sheet may then be used to wrap an item which is to be stored in a controlled environment. One means by which the joinder process may be accomplished is through a thermal extrusion procedure.

In each of the embodiments of the present invention described herein, advantages and enhancements over the prior art methods and structures stem from the discovery of the ability to create a co-continuous interconnecting channel morphology throughout the composition of the present invention so that a shaped article may be constructed from the composition of the present invention. Furthermore, in one embodiment, the discovery of employing a hydrophilic agent that also acts as a transmission rate bridge between the exterior of the polymer body and the interiorly located component C greatly enhances the structures' ability to quickly remove a desired property located exteriorly to the composition or to quickly release a desired property to the exterior.

One embodiment of the present invention includes a process for producing the composition of the present invention. In one embodiment, the process comprises blending a water-insoluble polymer (e.g. component A) and a hydrophilic agent (e.g. component B). Either prior to blending the hydrophilic agent or after blending the hydrophilic agent, component C is blended into the polymer so that the additive is uniformly distributed within the polymer and the hydrophilic agent is distributed within the polymer. Subsequently, after the composition is solidified, the result is that the hydrophilic agent forms interconnecting channels in the composition through which the desired property is transmitted through the polymer to component C within the composition. In another embodiment, component A, the hydrophilic agent (e.g. component B) and component C are all thoroughly mixed in dry powder form, and then the blend is melted and formed into a desired shape by molding. A co-continuous interconnecting channel morphology is formed in the composition.

Figure 2:
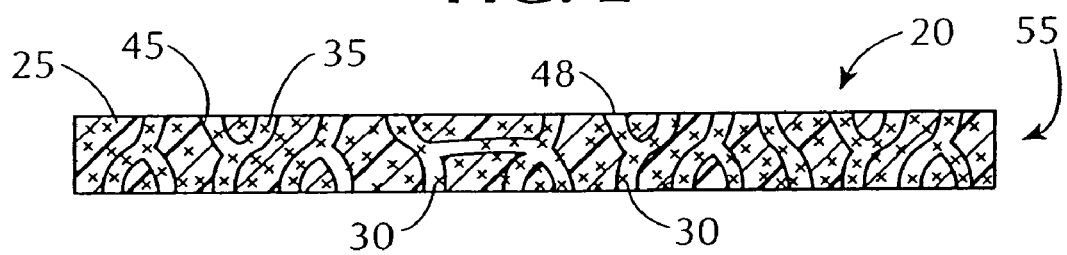
FIG. 2 is an exaggerated, cross-sectional view of a solidified plug formed from a water-insoluble polymer having a hydrophilic agent and an absorbing material blended therewith.
Figure 5:
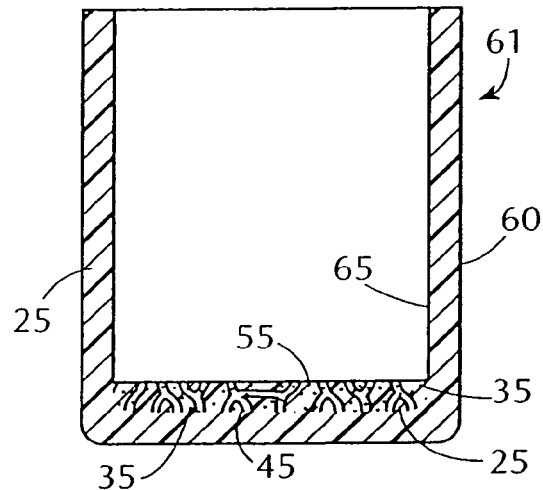
FIG. 5 is an exaggerated cross-sectional view of a portion of a container the composition of the present invention formed into a liner insert located within the interior of a container constructed from a polymer that acts as a transmission rate barrier.

Referring to FIG. 1 of the accompanying drawings of an embodiment of the present invention, an insert constructed from the composition of the present invention 20 is illustrated. For purposes of this disclosure of the present invention, the words "entrain" and "contain" have been used interchangeably when referring to the inclusion of component C 30 in composition 25. The insert is in the form of a plug 55 that may be deposited into a container body 60 (FIG. 5) thereby establishing a container 61 (FIG. 5). Referring to FIG. 2, a cross-sectional view is shown of the plug 55 that has been constructed from a polymer mixture comprising component A (25) that has been uniformly blended with component C (30) and component B 35. In the illustration of FIG. 2, the composition of the present invention has been solidified so that the co-continuous interconnecting channel morphology 45 have formed throughout the composition to establish passages throughout the solidified plug 55. As may be appreciated in both FIGS. 1 and 2, the passages terminate in channel openings 48 at an exterior surface of the plug 55.

Figure 3:
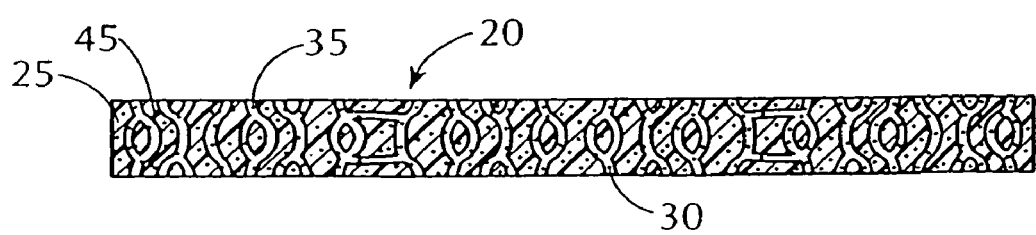
FIG. 3 is an exaggerated cross-sectional view of a portion of a container having the composition of the present invention formed into a plug insert located in the bottom of a container constructed from a polymer that acts as a transmission rate barrier.

FIG. 3 illustrates an embodiment of the present invention of a plug 55 which has been deposited into a container body 60 thereby establishing a container 61 having the desired absorbing and/or releasing and/or activation properties. The container body 60 has an interior surface 65 and is constructed substantially from the composition of the present invention. In this manner, the transmission property is resisted from being transmitted across a wall of the container 60 when the container 60 is closed. As may be seen in FIG. 3, the plug 55 has been press fit into a bottom location of the container 60. It is contemplated that the plug 55 may be merely deposited in the container 60 for loose containment therein, but may also be coupled to the body of the container 60 in a manner that fixes the plug 55 to the container 60. The couple between the plug 55 and the container body 60 is intended to prevent the dislocation and relative movement of the plug 55 thereabout. This connection may be accomplished by a snug press fit between the plug 55 and the interior surface 65 of the body 60, or it may be mechanically connected in such manners as adhesives, prongs, lips or ridges that extend about the plug 55 to hold the plug 55 in place. In yet another embodiment, it is contemplated that the container body 60 may be molded about the plug 55 so that during the curing process of the container body 60 the body 60 shrinks about the plug 55 thereby causing a shrink-fit to be established between the two components. This type of couplement may also be accomplished in a comolding process or sequential molding process with the same results achieved because the plug 55 will have less shrinkage than the polymer 25 comprised container body 60.

Figure 4:
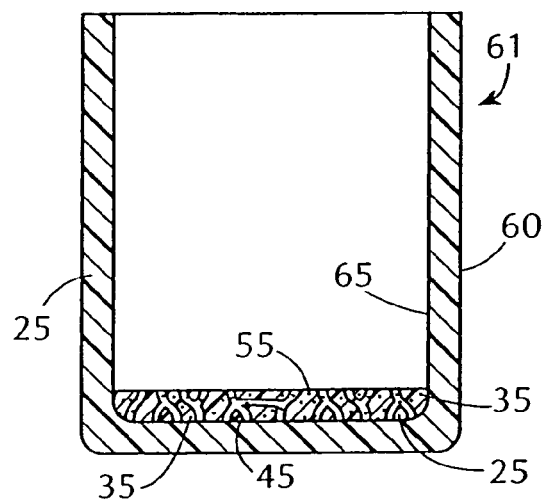
FIG. 4 is an exaggerated cross-sectional view of a portion of a container the composition of the present invention formed into a plug that has been comolded into the bottom of a container that is constructed from a polymer that acts as a transmission rate barrier.

FIG. 4 illustrates an absorbing container 61 having the composition of the present invention formed of a plug 55 located at a bottom location of the container 60 similar to the configuration illustrated in FIG. 3, but the plug 55 and container body 60 are comolded so that a unified body 61 is formed with a less distinct interface between the plug 55 and body 60 components.

Figure 6:
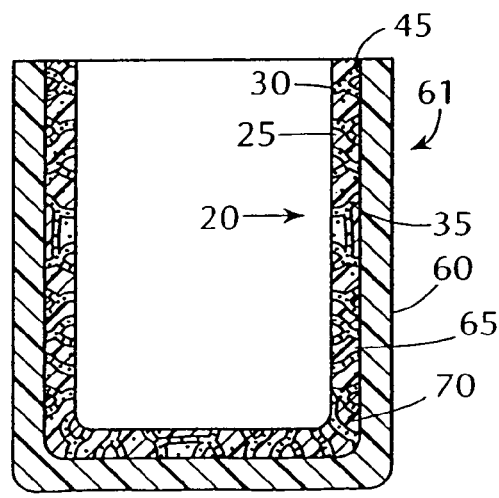
FIG. 6 is an exaggerated cross-sectional view of a portion of a container having the composition of the present invention formed into a liner that has been comolded at the interior of a container that is constructed from a polymer that acts as a transmission rate barrier.

FIGS. 5 and 6 illustrate concepts similar to those of FIGS. 3 and 4, however the proportions of the plug 55 have been extended so that a liner 70 is formed which covers a greater portion of the interior surface 65 of the desiccating container 61. The liner 70 is not localized in the bottom portion of the container body 60, but has walls which extend upwardly and cover portions of the walls of the container 61. Like the plug 55, the liner 70 may be separately molded and subsequently combined with the container body 60 or it may be comolded therewith into the unified body illustrated in FIG. 6.

Figure 7:
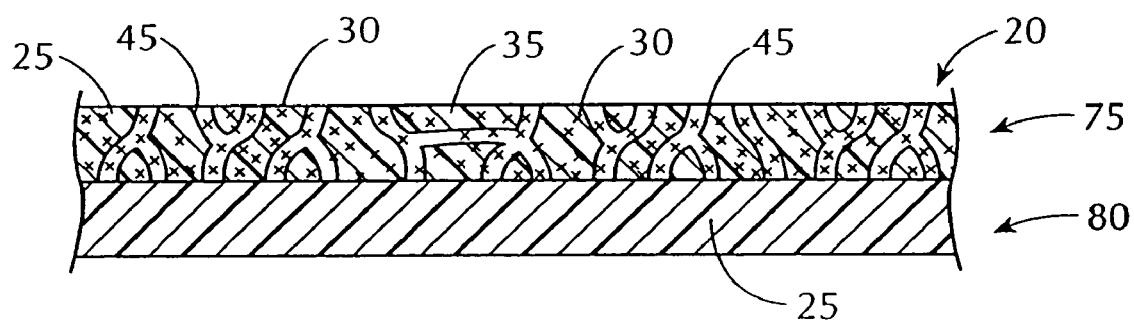
FIG. 7 is an exaggerated cross-sectional view of the composition of the present invention formed into a sheet located adjacent to a barrier sheet constructed from a polymer that acts as a transmission rate barrier.
Figure 8:
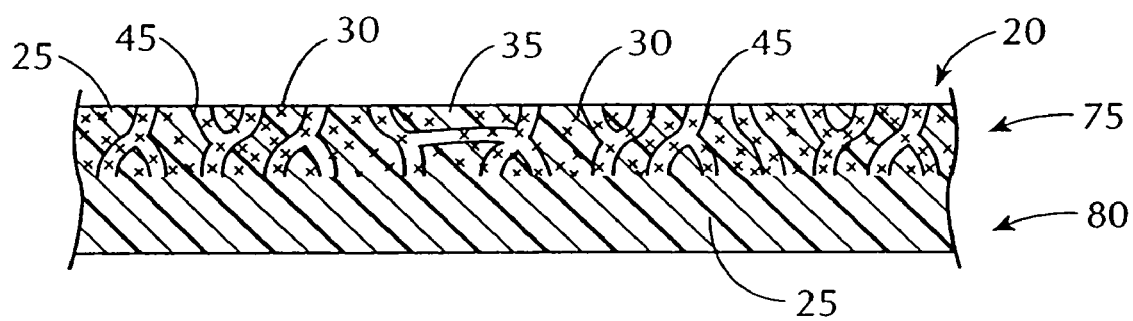
FIG. 8 is an exaggerated cross-sectional view the composition of the present invention formed into a sheet that has been comolded at an interior of a barrier sheet so that the products are integrally molded together and comprise one unified laminate.

FIGS. 7 and 8 illustrate an embodiment of the invention in which a sheet of the present invention 75 is created for combination with a barrier sheet 80. The characteristics of the sheets are similar to those described with respect to the plug 55 and liner 70 and container body 60. That is, FIG. 7 illustrates an embodiment in which the two sheets 75, 80 are separately molded, and later combined to form a packaging wrap having the desired absorbing and/or releasing characteristics at an interior surface and impermeability characteristics at an exterior surface. FIG. 8 illustrates a comolded process wherein an interface between sheet 75 and the barrier sheet 80 is less distinct than in the embodiment of FIG. 7. This product can be produced by a thermal, forming process. It is contemplated that the separate sheets 75, 80 of FIG. 7 may be joined together with an adhesive or other suitable means to form a laminate from the plurality of sheets 75, 80. Alternatively, the sheeting 75, 80 may be manufactured from a thermal extrusion process whereby both sheets 75, 80 are manufactured at the same time and effectively comolded together to form the embodiment illustrated in FIG. 8.

In a further embodiment of the present invention, a plug 55 is formed from the mixture for inclusion within a container 60 that is constructed from a barrier substance. In one embodiment, the plug 55 is deposited into a container 60 that is constructed from a barrier substance. In this manner, container 61 of the present invention is created. The plug 55 may be coupled to an interior surface of the container body 60 so that the plug 55 is fixed relative to the container 60.

Alternatively, a container 60 constructed from a barrier substance may be molded about the plug 55 so that at least a portion of the plug 55 is exposed to an interior of the container 60. Plug 55 made according to the present invention may also be co-molded with a container 60 that is constructed from a barrier substance so that at least a portion of the plug 55 is exposed to an interior of the container 60.

In another embodiment, a liner 70 may be formed from the mixture 40 and then be included within a container 60 constructed from a barrier substance. The liner 70 typically, but not necessarily, has an exterior surface configured for mating engagement with an interior surface 65 of the container 60. The liner 70 may be pressed into mating engagement with the container 60 so that a container 61 is created wherein at least a majority of the interior surface 65 of the container is covered by the liner 70. The liner 70 may be formed from the mixture 40 and then a container 60 constructed from a barrier substance may be molded about the liner 70 so that at least a portion of the liner 70 is exposed to an interior of the container 60 and a majority of an interior surface 65 of the container 60 is covered by the liner 70.

Alternatively, the liner 70 and container body 60 may be comolded together into a unified body. The absorbing sheet 75 is combined with a barrier sheet 80 that is constructed of a barrier substance for use as a packaging wrap. The sheets 75, 80 may be laminated by thermal extrusion.

In still another embodiment of the present invention, a method for making a container 61 of the present invention is provided. The method includes forming a container 60 from substantially gas impermeable material so that a gas barrier is created between an interior and exterior of the container. An insert is formed from composition of the present invention. The insert has an exterior surface that is configured for mating engagement with at least a portion of an interior surface 65 of the container 60. The insert is installed into the interior of the container 60 so that at least a portion of the exterior surface of the insert abuttingly engages the interior surface 65 of the container 60. The engagement fixes the insert relative to the container 60 and resists disengagement of the insert from the container 60. The insert is exposed to the interior of the container 60 for absorbing the desired property. The insert is pressed into the interior of the container 60 with sufficient force that the insert fits tightly within the container 60 thereby resisting disengagement therefrom. The insert is sized and shaped so that the insert fits snugly into a receiving location within the interior of the container for retention at the receiving location.

In yet another embodiment, a method for making an absorbing container 61 is provided. A container is formed from substantially air and moisture impermeable material so that a barrier is established between an interior and exterior of the container 60. A substantially solid tablet or plug 55 is formed from the composition of the present invention 20, the tablet 55 being suitably sized to fit within the interior of the container 60. The tablet 55 is then deposited into the interior of the container 60 thereby establishing a means for absorbing the desired material from the interior of the container 60 when the container 60 is closed about the tablet 55.

The present invention will be illustrated in greater detail by the following specific examples. It is understood that these examples are given by way of illustration and are not meant to limit the disclosure or claims. For example, although the following examples were tested at 10% Rh and 20% Rh at 72° F., the composition of the present invention is also suited for other conditions. Moreover, these examples are meant to further demonstrate that the present invention has a co-continuous interconnecting channel morphology and that component B predominately resides in the interconnecting channels. All percentages in the examples or elsewhere in the specification are by weight unless otherwise specified.

EXAMPLE 1

The purpose of the following example is to demonstrate that the composition of the present invention has the co-continuous interconnecting channel morphology by subjecting the following materials to a swelling and weight loss analysis.

A. Preparation of Samples

Film #1: A blend of about 93% (w/w) of polypropylene (Exxon Chemicals, tradename Escorene® polypropylene 3505 G) and about 7% (w/w) of poly(ethylene glycol) (Dow Chemical, tradename E-4500) was sufficiently mixed to produce a uniform blend. The blend was then fed through a Leistritz twin screw extruder at temperatures in the sixteen zones ranging from about 145° C. to about 165° C., at a feed rate of about 40 lbs/hr, at a screw speed of about 460 rpm and a six inch die. The extruded composition was then fed through a three roll hot press at temperatures ranging from about 85° C. to about 92° C. to produce a film of about 4 mil.

Film #2: A blend of about 68% (w/w) of polypropylene (Exxon Chemicals, tradename Escorene® polypropylene 3505 G) and about 3505 G), about 12% (w/w) of poly(ethylene glycol) (Dow Chemical, tradename E-4500) and about 20% (w/w) of a desiccant of molecular sieve (Elf Atochem, tradename Siliporite® molecular sieve, 4 Angstrom) was sufficiently mixed to produce a uniform blend. The blend was then fed through a Leistritz twin screw extruder at temperatures in the sixteen zones ranging from about 145° C. to about 165° C., at a feed rate of about 40 lbs/hr at a screw speed of about 460 rpm and a six inch die. The extruded composition was then fed through a three roll hot press at temperatures ranging from about 85° C. to about 92° C. to produce a film of about 4 mil.

Film #3: A blend of about 34.88% (w/w) of polypropylene (Exxon Chemical, tradename Escorene® polypropylene 3505 G), about 11.96% (w/w) of poly(ethylene glycol) (Dow Chemical, tradename E-4500), about 52.82% (w/w) of a desiccant of molecular sieve (Elf Atochem, tradename Siliporite® molecular sieve, 4 Angstrom) and about 0.34% (w/w) of a grey colorant was sufficiently mixed to produce a uniform blend. The blend was then fed through a Leistritz twin screw extruder at temperatures in the sixteen zones ranging from about 145° C. to about 165° C., at a feed rate of about 50 lbs/hr at a screw speed of about 460 rpm and a six inch die. The extruded composition was then fed through a three roll hot press at temperatures ranging from about 85° C. to about 92° C. to produce a film of about 4 mil.

B. Swelling And Weight Loss Analysis

Figure 9:
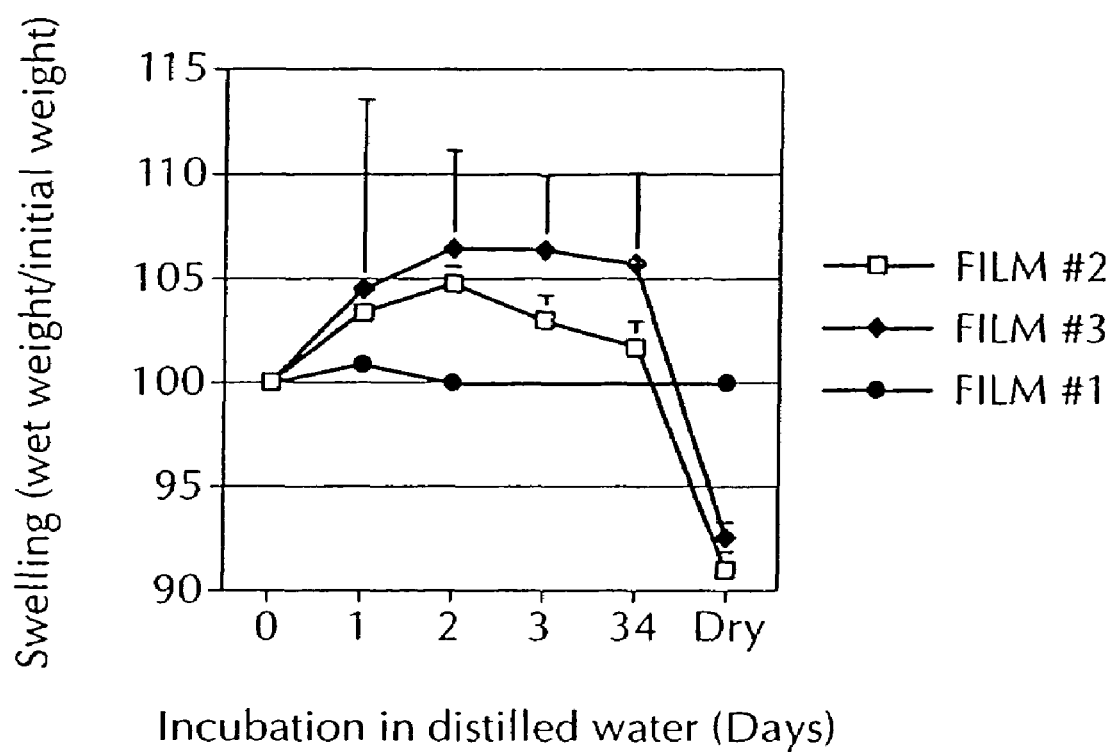
FIG. 9 is a graphical view of a swelling and weight loss analysis of three film samples: Film #2, Film #3 and Film #4.

Circular disks (OD 1.1 cm) were cut from each of the three samples. Initial dry weights of each sample was recorded. Samples were subsequently incubated in 2.0 ml distilled water and left shaking at room temperature. Periodically at 1, 2, 3, and 34 days, the disks were removed, the surface blotted dry and the sample weighed, to determine the extent of swelling. At each timepoint, the distilled water was replaced to provide for sink conditions. At the end of the study, the samples were lyophilized to remove the water and the sample weighed to determine mass loss. FIG. 9 is a graph of the result of the analysis. Percent swelling is defined as the wet weight at a time point (t), divided by initial dry weight (zero) and multiplied by 100. 'Dry' indicates the final lyophilized sample weight following the 34 day incubation.

FIG. 9 shows film #1 did not swell or lose weight over the course of 34 days. Thus, it is believed that this result shows that the poly(ethylene glycol) (i.e., hydrophilic agent) was completely entrapped in the polypropylene (i.e., water-insoluble polymer). Film #2 gained approximately 3% of its initial weight by swelling and lost approximately 9% of its initial weight at the end of the 34 days of incubation. Film #3 gained approximately 6% of its initial weight and lost approximately 8% of its initial weight at the end of the 34 day incubation period. These results demonstrate that interconnecting channels from the exterior through the interior exist in the composition of the present invention because water penetrated films #2 and #3 and a substantial portion of the water soluble component (e.g., poly(ethylene glycol)) of films #2 and #3 was extracted from the polymer.

EXAMPLE 2

The purpose of the following example is to demonstrate that the composition of the present invention has two separate phases consisting of a component A (e.g. water-insoluble polymer) and component B (e.g. hydrophilic agent).

A. Preparation Of Samples

Film #4: 100% polypropylene (Exxon Chemicals, tradename Escorene® polypropylene 3505 G) was fed through a Leistritz twin screw extruder at temperatures in the sixteen zones ranging from about 145° C. to about 165° C., at a feed rate of about 40 lbs/hr, at a screw speed of about 460 rpm and a six inch die. The extruded composition was then fed through a three roll hot press at temperatures ranging from about 85° C. to about 92° C. to produce a film of about 4 mil.

Film #5: A blend of about 88% (w/w) of polypropylene (Exxon Chemicals tradename Escorene® polypropylene 3505 G), about 12% (w/w) of poly(ethylene glycol) (Dow Chemical, tradename E-4500) was sufficiently mixed to produce a uniform blend. The blend was then fed through a Leistritz twin screw extruder at temperatures in the sixteen zones ranging from about 145° C. to about 165° C., at a feed rate of about 40 lbs/hr, at a screw speed of about 460 rpm and a six inch die. The extruded composition was then fed through a three roll hot press at temperatures ranging from about 85° C. to about 92° C. to produce a film of about 4 mil.

Film #7: A blend of about 68% (w/w) of polypropylene (Exxon Chemicals, tradename Escorene® polypropylene 3505 G), about 12% (w/w) of poly(ethylene glycol) (Dow Chemical, tradename E-4500) and about 20% (w/w) of a desiccant of molecular sieve (Elf Atochem, tradename Siliporite® molecular sieve, 4 Angstrom) was sufficiently mixed to produce a uniform blend. The blend was then fed through a Leistritz twin screw extruder at temperatures in the sixteen zones ranging from about 145° C. to about 165° C., at a feed rate of about 12 lbs/hr, at a screw speed of about 460 rpm and a six inch die. The extruded composition was then fed through a three roll hot press at temperatures of about 105° C. to produce a film of about 4 mil.

B. Thermal Analysis Using Differential Scanning Calorimetry ("DSC")

The processed film samples were analyzed using a Perkin Elmer DSC7 equipped with a TAC 7DX thermal controller. Data were analyzed using Perkin Elmer Pyris software (version 2.01). Samples were heated from −50 to 250° C. at a rate of 10 or 15° C./min, then cooled at the same rate and then heated once again to 250° C. at the same rate. The following table is the date collected from the DSC. The melting point data is given as the melting point peak (° C.) and enthalpy (H, joules/gm) for the first heating ramp (1°) and the second heating ramp (2°). The column referring to FIGS. 10 through 18 is the graphical output from the DSC that corresponds to the date from the table. Since the samples are only heated to 250° C., the molecular sieve in film samples #2, #3 and #7 was not melted and thus, no melting point date was recorded.

Figure 10:
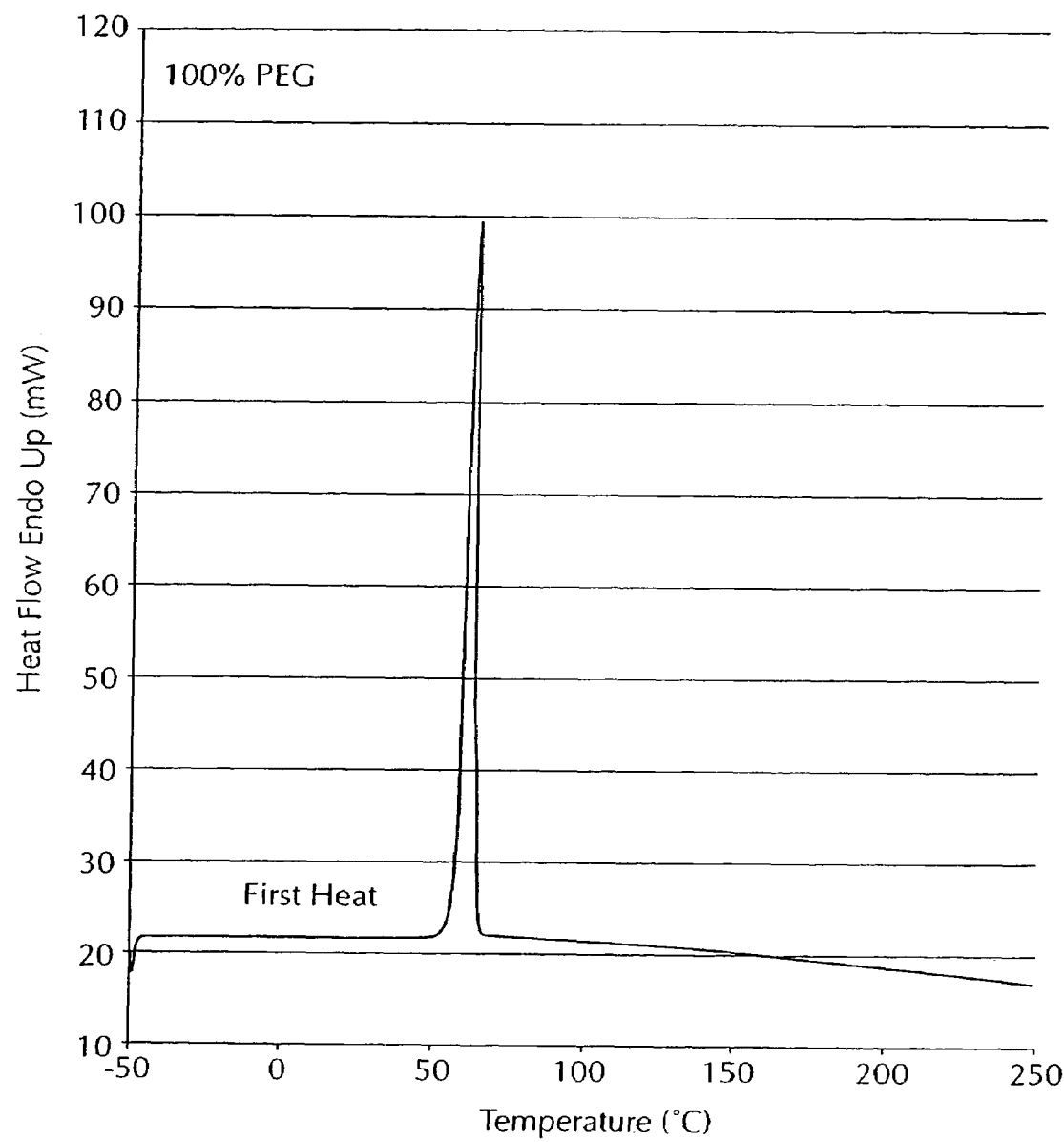
FIG. 10 is a graphical view of a DSC curve of a sample of 100% polyglycol.
Figure 11:
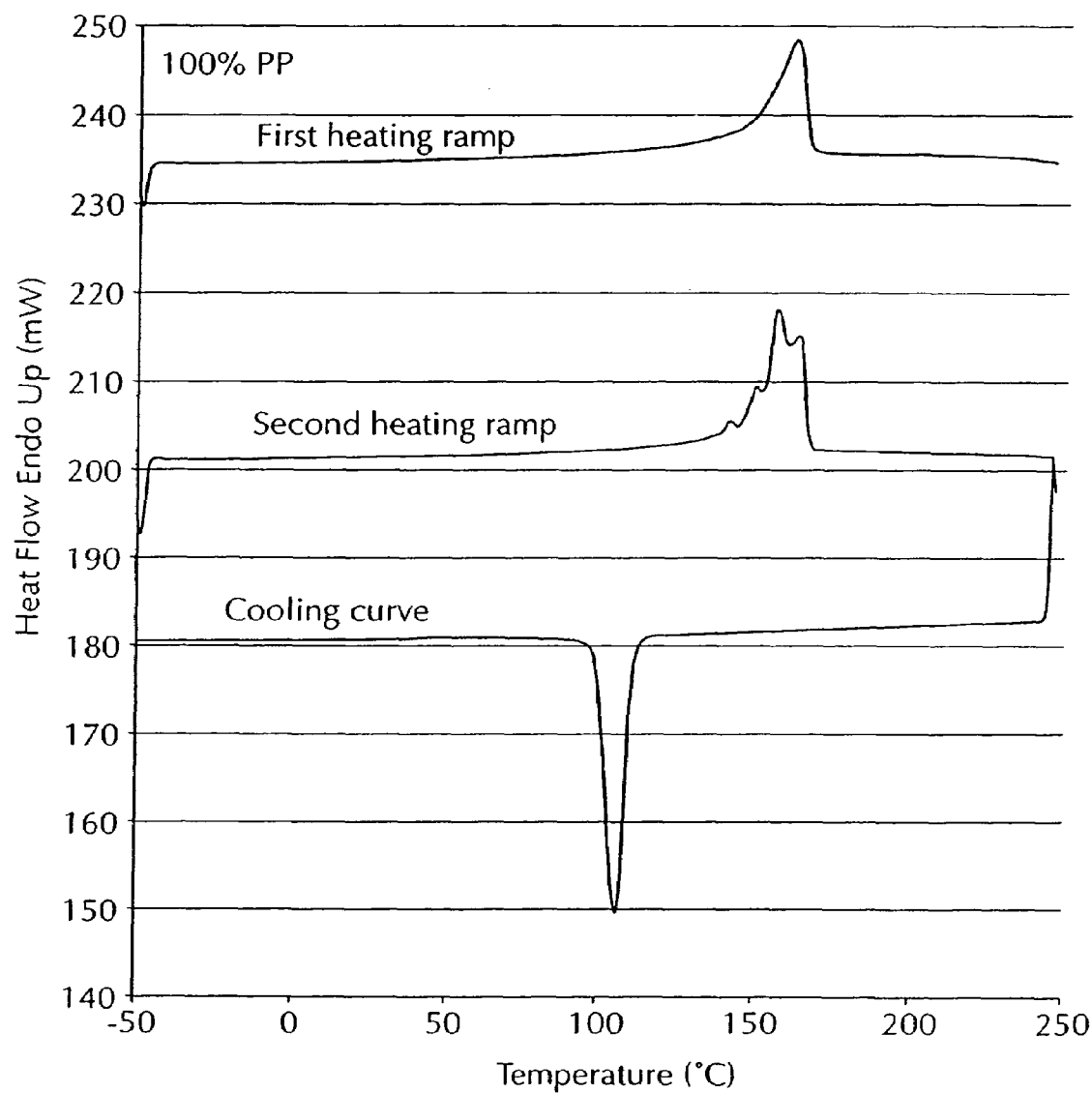
FIG. 11 is a graphical view of a DSC curve of a sample of Film #4.
Figure 12:
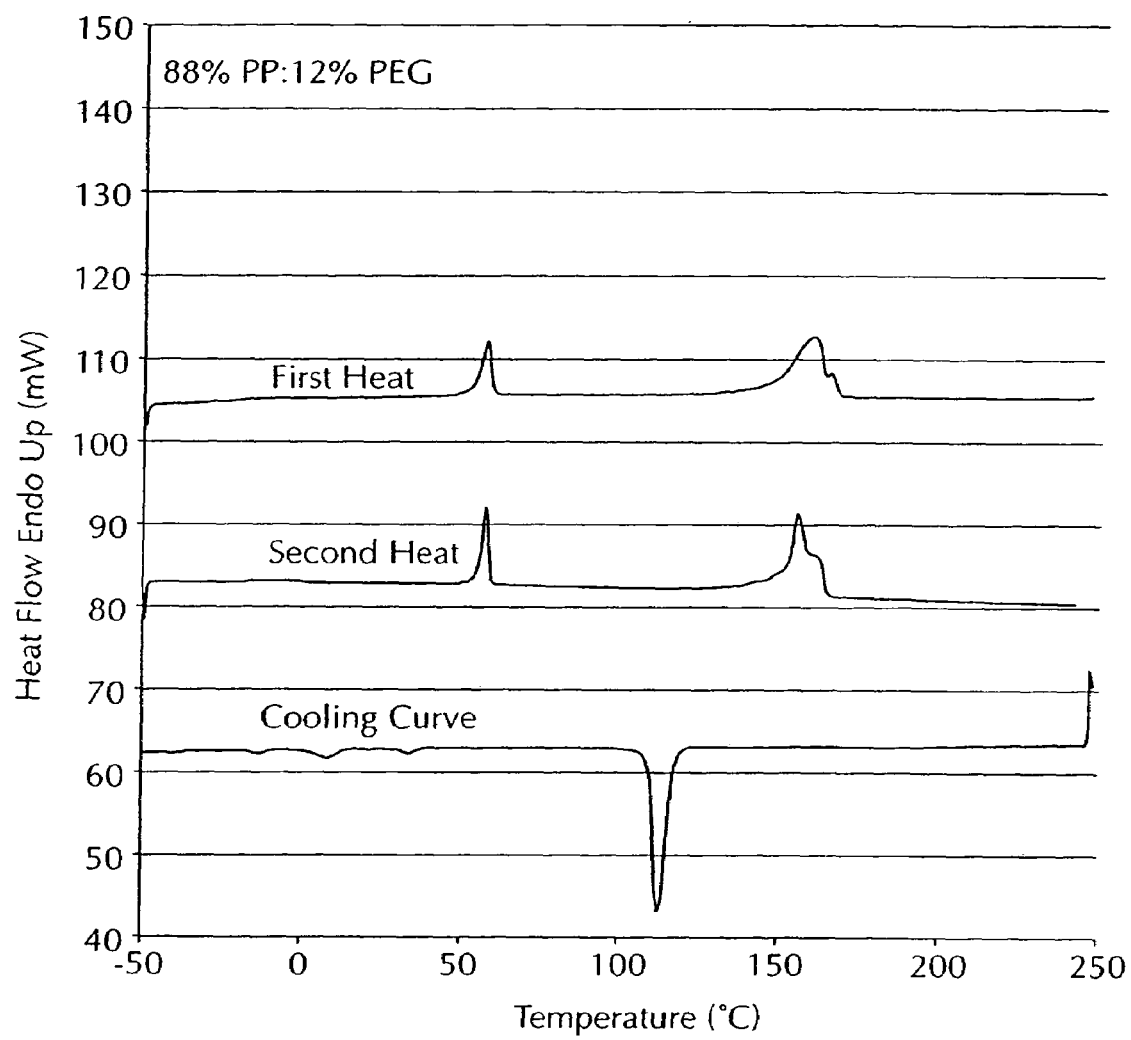
FIG. 12 is a graphical view of a DSC curve of a sample of Film #5.
Figure 13:
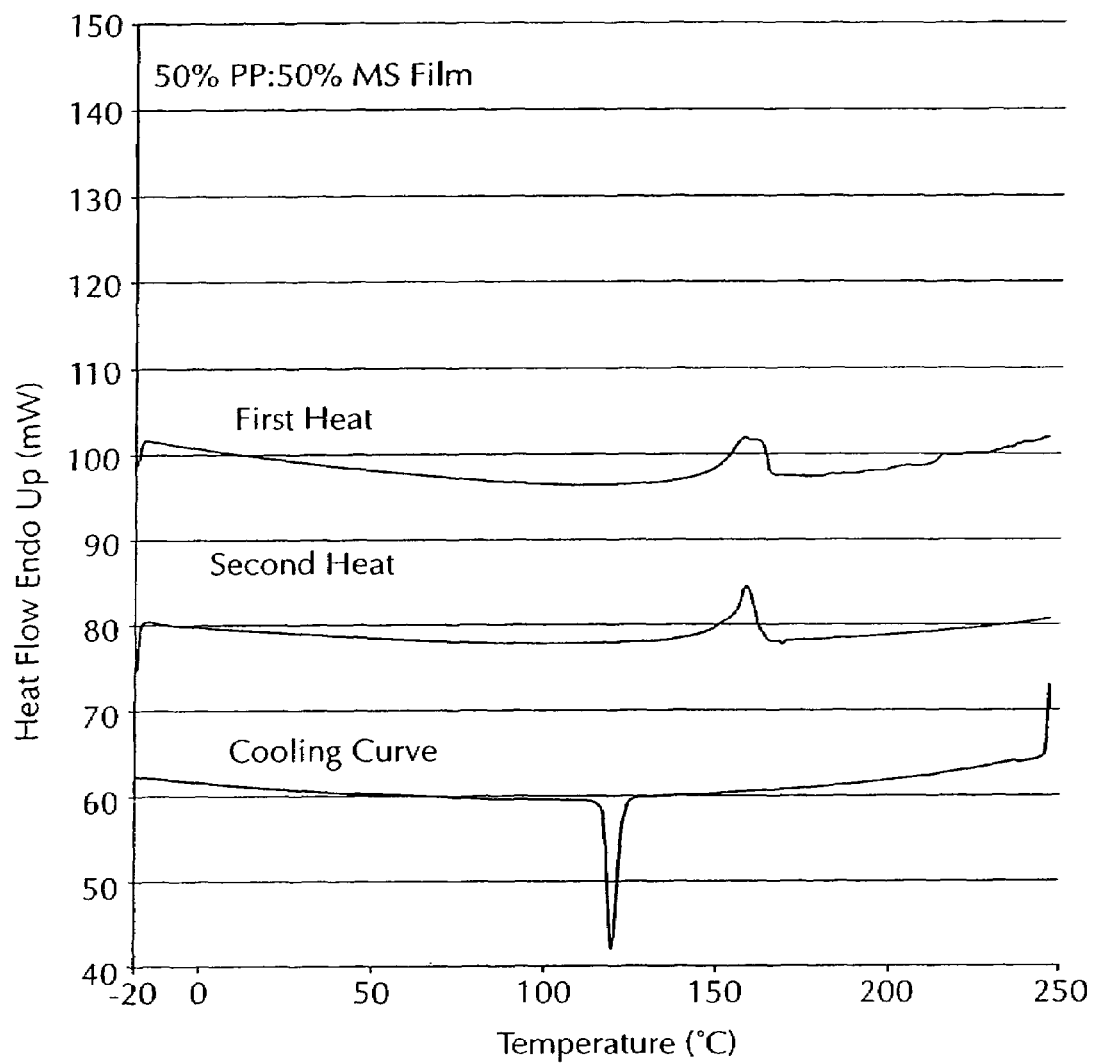
FIG. 13 is a graphical view of an DSC curve of a sample of Film #6.
Figure 14:
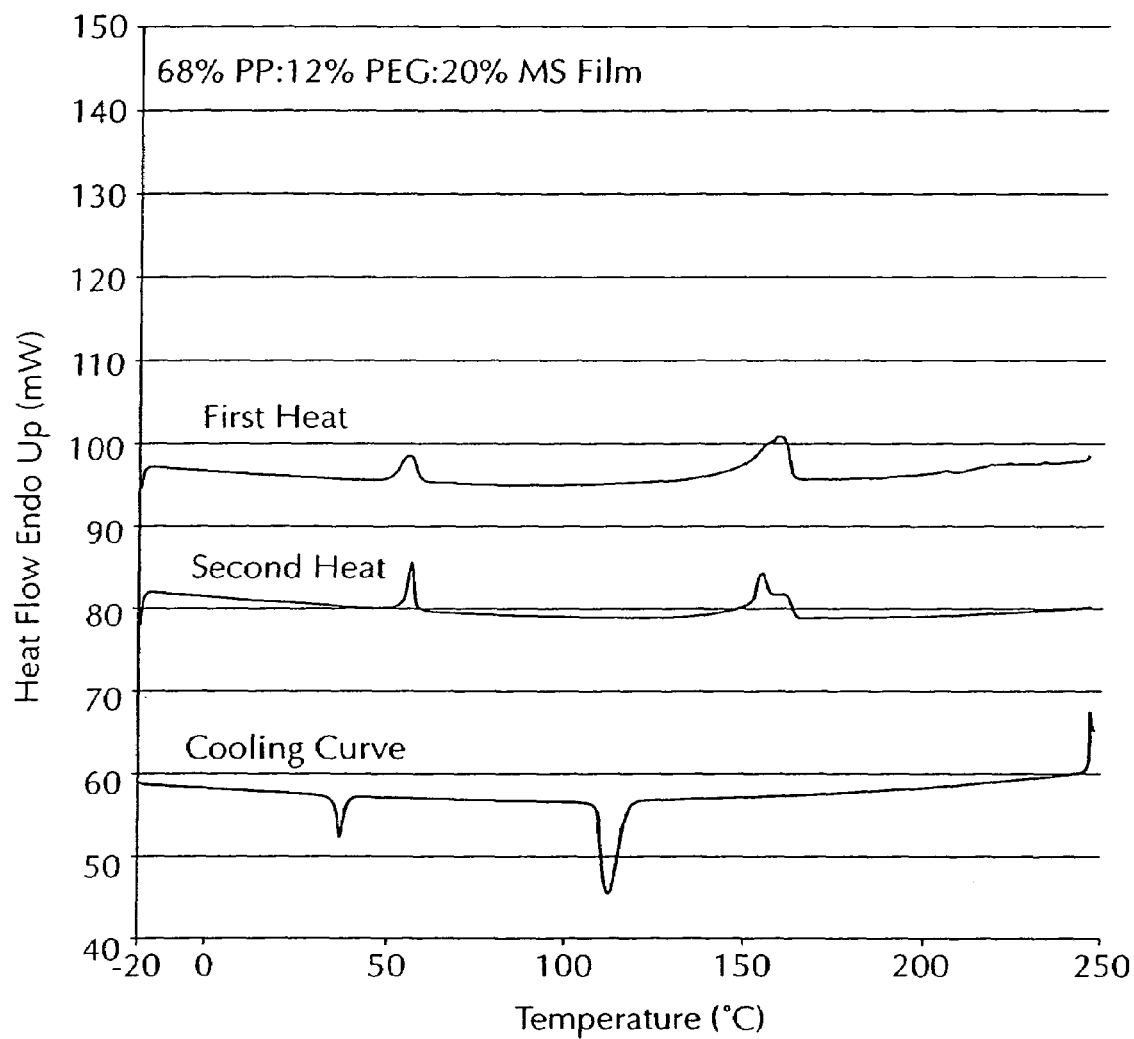
FIG. 14 is a graphical view of a DSC curve of a sample of Film #7.
Figure 15:
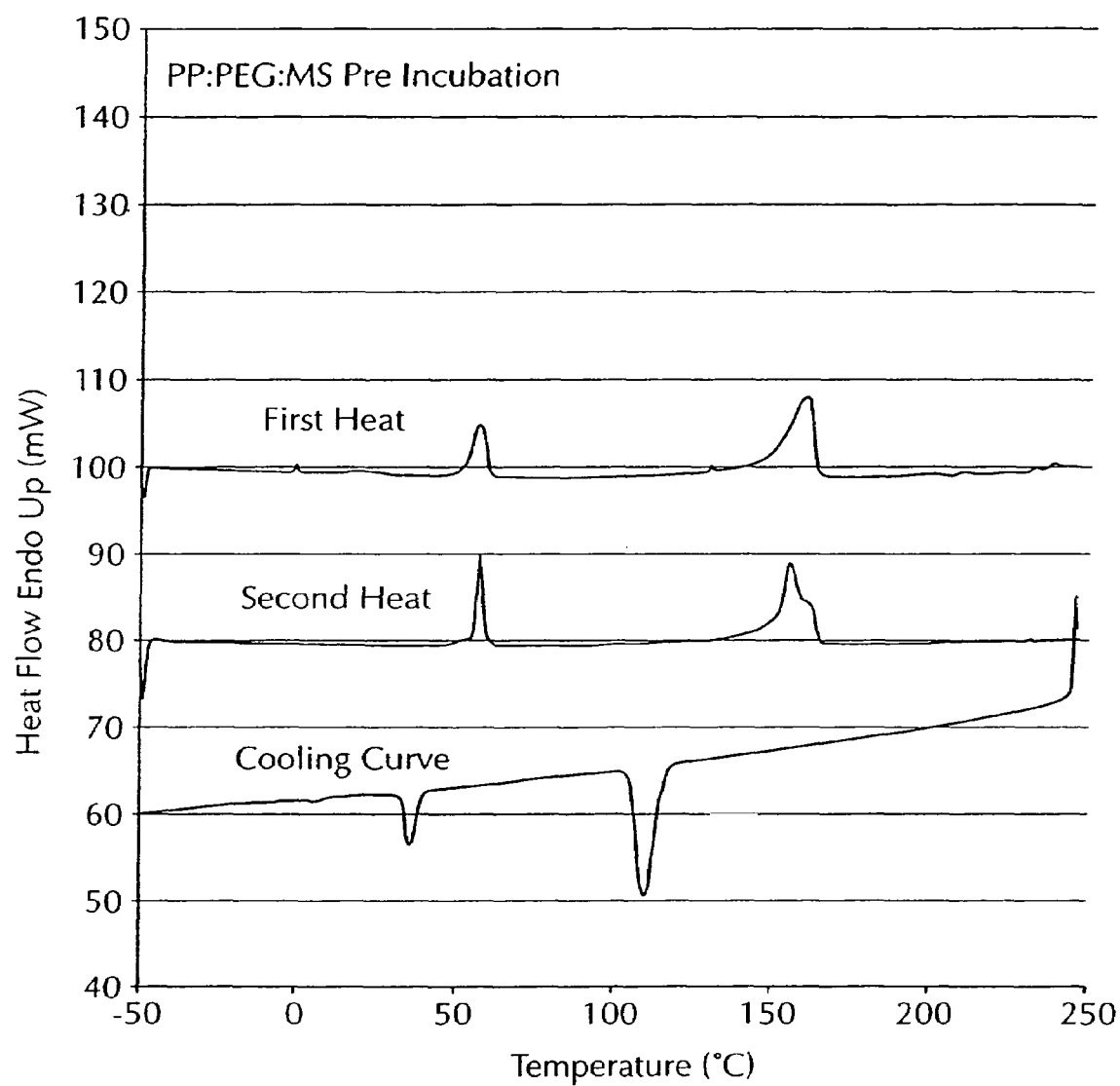
FIG. 15 is a graphical view of a DSC curve of a sample of Film #2 in a pre-incubation state.
Figure 16:
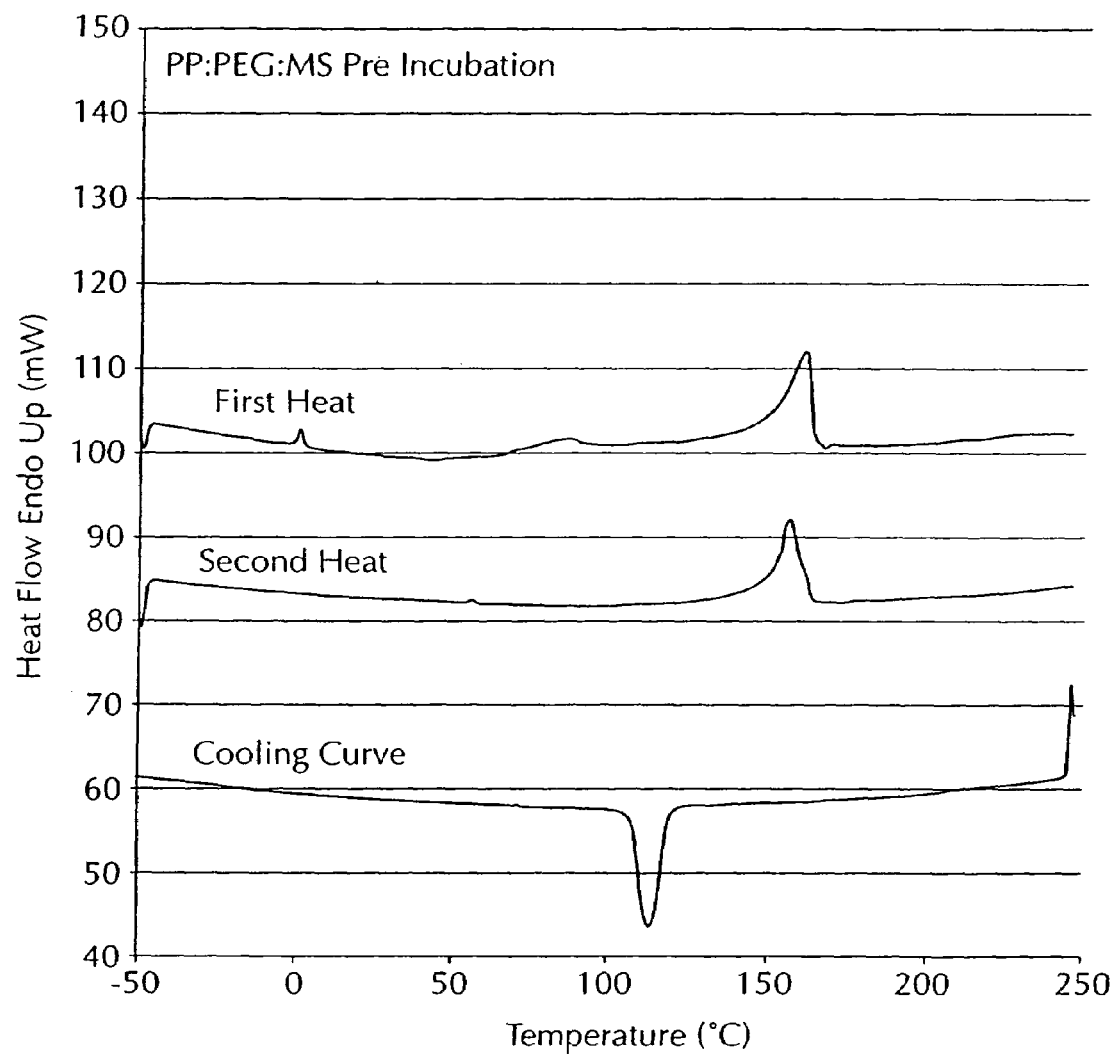
FIG. 16 is a graphical view of a DSC curve of a sample of Film #2 in a post-incubation state.
Figure 17:
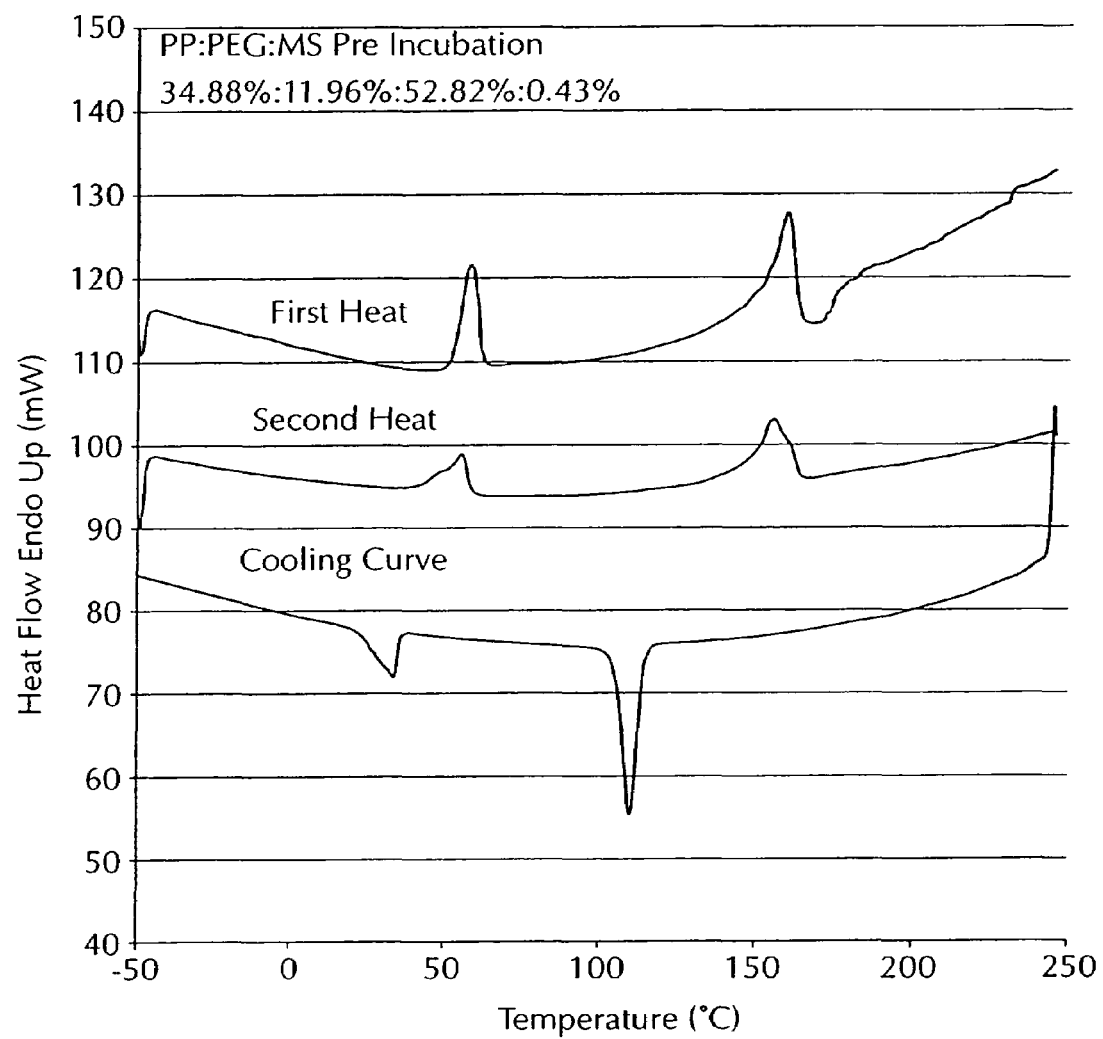
FIG. 17 is a graphical view of a DSC curve of a sample of Film #3 in a pre-incubation state.
Figure 18:
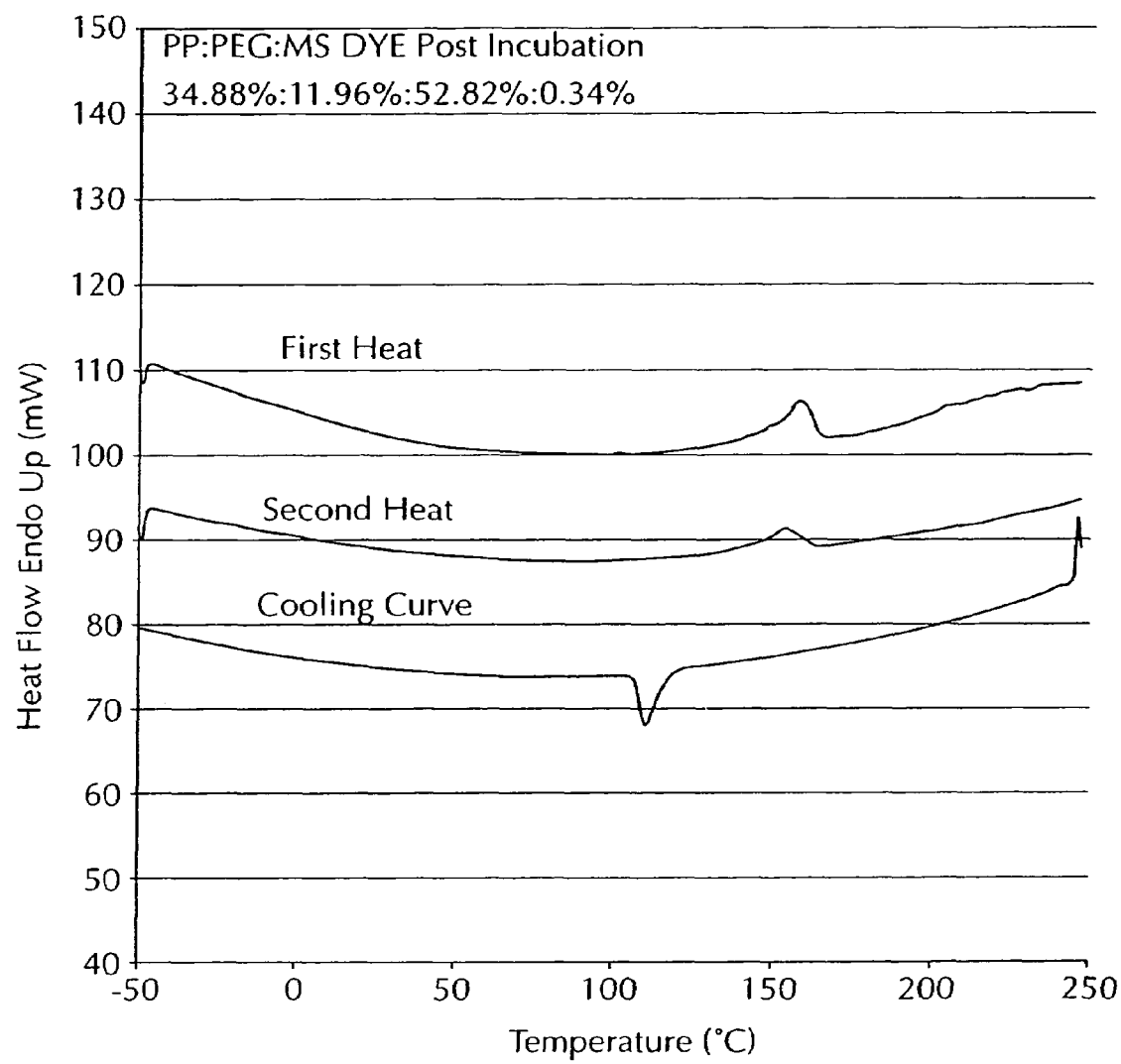
FIG. 18 is a graphical view of a DSC curve of a sample of Film #3 in a post-incubation state.

| Sample | Figure # | PEG Peak \C | PEG ⌬J/g | PP Peak \C | PP ⌬J/g |
|---|---|---|---|---|---|
| 100% poly-(ethylene-glycol) | FIG. 10 | 1\63.808 | 190.362 | none | none |
| Film #4 | FIG. 11 | 1\none | none | 162.700 | 78.462 |
|  |  | 2\none | none | 157.200 | 96.123 |
| Film #5 | FIG. 12 | 1\57.700 | 22.253 | 161.700 | 80.524 |
|  |  | 2\58.033 | 20.361 | 157.366 | 79.721 |
| Film #6 | FIG. 13 | 1\none | none | 159.366 | 42.385 |
|  |  | 2\none | none | 160.033 | 42.876 |
| Film #7 | FIG. 14 | 1\56.366 | 19.460 | 162.200 | 70.073 |
|  |  | 2\57.200 | 17.094 | 156.866 | 58.038 |
| Film #2 [pre-incubation] | FIG. 15 | 1\58.554 | 20.845 | 163.062 | 60.577 |
|  |  | 2\58.779 | 16.037 | 157.783 | 53.706 |
| Film #2 [post-incubation] | FIG. 16 | 1\55.804 | 0.379 | 163.062 | 86.215 |
|  |  | 2\57.529 | 0.464 | 158.533 | 67.949 |
| Film #3 [pre-incubation] | FIG. 17 | 1\59.308 | 18.849 | 162.562 | 40.291 |
|  |  | 2\56.529 | 10.122 | 158.283 | 24.980 |
| Film #3 [post-incubation] | FIG. 18 | 1\55.554 | 0.138 | 160.562 | 46.931 |
|  |  | 2\none | none | 156.033 | 26.081 |

The 100% poly(ethylene glycol) sample, exhibits a single melting point at 63° C. while film #4 100% polypropylene has a melting point at 157° C. Film #5 displayed both peaks at 58° C. (poly(ethylene glycol)) and 157° C. (polypropylene), which indicates that the two polymers were phase separated. If the polymers were not phase separated but mixed, then the peaks would not be at the melt temperatures of the pure polymers, but shifted. Film #6 shows only the distinct polypropylene peak at 160° C. The molecular sieves do not melt in this temperature range or affect the melting temperature of pure polypropylene. Film #7 again shows two distinct peaks: one for poly(ethylene glycol) at 57° C. and one for polypropylene at 157° C. indicating that in the three component mixture, all are phase separated.

Film samples #2 and 3 were part of the swelling and weight loss analysis presented in Example 1. Once again two distinct peaks were evident: one for poly(ethylene glycol) at 59° C. and one for polypropylene at 158° C. indicating that in the three component mixture, all components were phase separated. However when the polymer film was incubated in water for 34 days at room temperature (File #2: post-incubation) and tested by DSC, the positions of the peaks remained the same indicating the components were still phase-separated. However the area of the poly(ethylene glycol) peak (indicated by delta H, enthalpy) was greatly reduced. This result indicated that poly(ethylene glycol) had been extracted by the prolonged water incubation. Also, the result provided further confirmation for the weight loss data presented in Example 1 and demonstrated that the poly (ethylene glycol) component was mostly extracted by means of interconnecting channels in the bulk polypropylene matrix.

Film sample #3 showed the same effect as Film sample #2. The polypropylene delta H peak was not detectable (Film #3: post-incubation), demonstrating nearly complete extraction of poly(ethylene glycol) during water incubation. This confirmed the weight loss result of Example 1 in which the same film lost approximately 8% of it's initial weight. The poly(ethylene glycol) composition of the sample was approximately 12% (w/w).

In addition, the glass transition ($T_g$) analysis from the DSC data of the samples of the present invention also demonstrate that the water-insoluble polymer and the material exist in separate phases. Pure polypropylene exhibits a $T_g$ of about −6 C while pure poly(ethylene glycol) exhibits a $T_g$ at about −30 C. DSC data from film #5 exhibit two distinct $T_g$'s, which correspond to the respective polymers (6 C for polypropylene and −30 C for poly(ethylene glycol) and thus, indicates, further that the two components are phase separated.

EXAMPLE 3

The purpose of the following example is to demonstrate that the composition of the present invention has a co-continuous interconnecting channel morphology and has component C (e.g. the water absorbing material) intermixed within component B (e.g. hydrophilic agent).

A. Scanning Electron Microscopy ("SEM") Method

The structural properties of the films was imaged using a Hitachi S-2700 microscope operating at 8 kV accelerating voltage to minimize irradiation damage. Each film sample was visualized in three perspectives: 1) the film surface; 2) the fractured film cross-section (0°) and 3) the fractured film cross-section at a 90° angle with respect to orientation #2 (90°). Pre-incubation film samples were directly sputter coated with a 5–10 nm layer of gold-palladium with a Polaron Instruments Sputter Coater E5100. Post-incubation samples were incubated at room temperature for 24 hrs in 10 ml of 70% ethanol (w/v) with agitation. The ethanol was discarded and the samples were air-dried overnight. Samples were then frozen and lyophilized overnight to remove any residual moisture and then sputter coated.

Figure 19A:
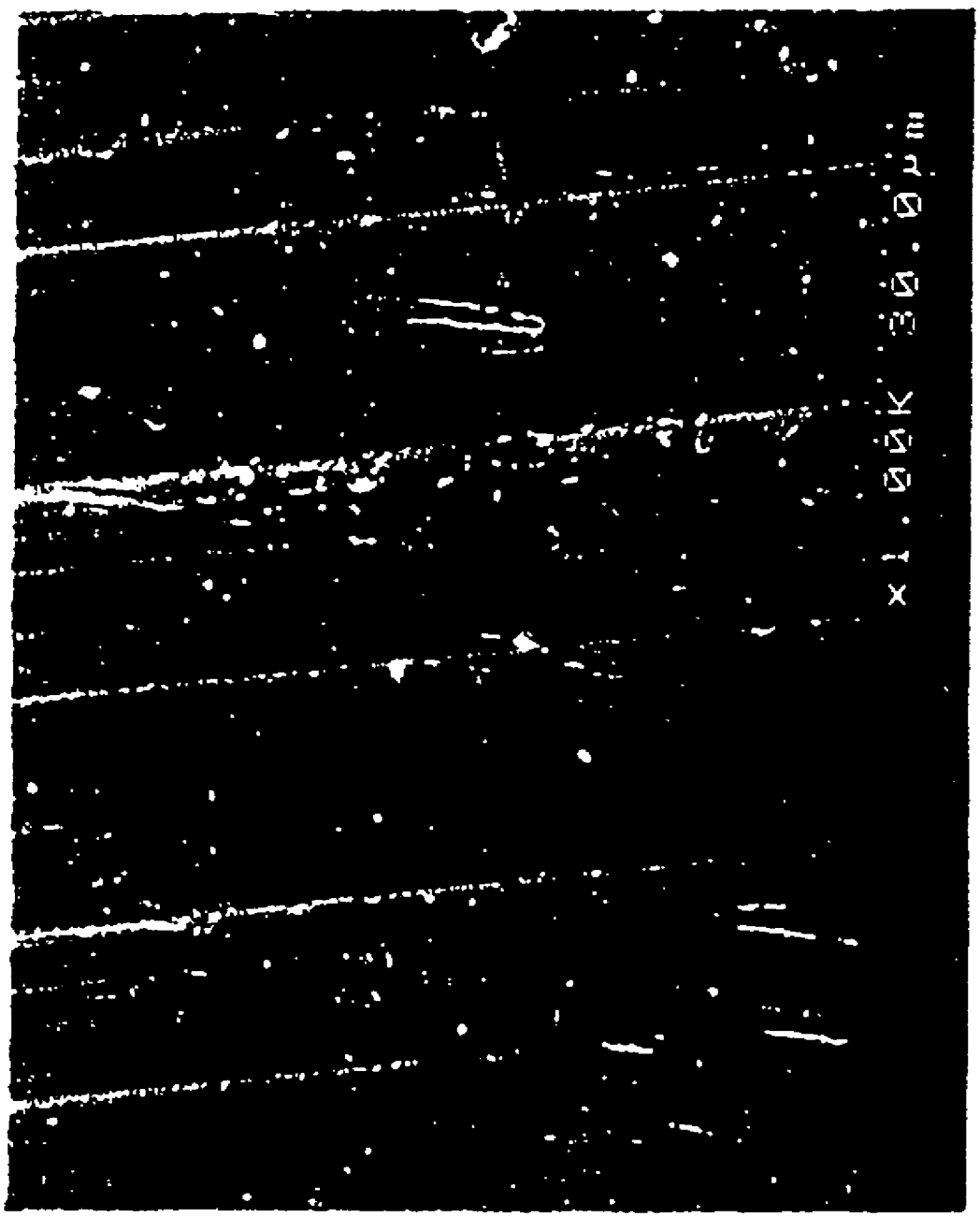
FIG. 19a-c are scanning electron photomicrographs of a film sample of Film #4.
Figure 19B:
Figure 19C:
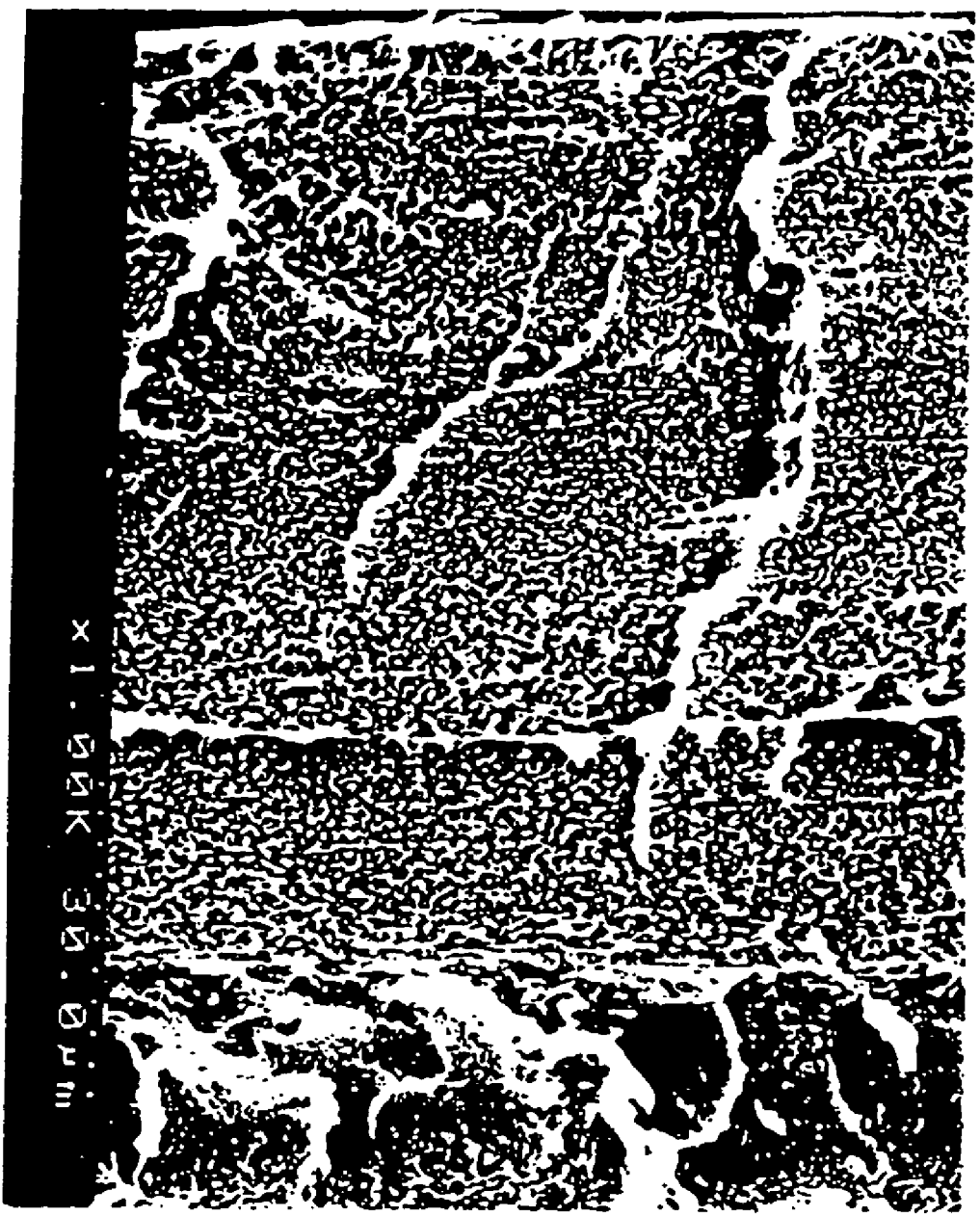

B. Morphology of Film Samples:

FIGS. 19a–c are scanning electron photomicrographs of film sample #4—100% polypropylene. FIGS. 19a–c illustrate that a water-insoluble polymer is typically a dense, homogenous morphology with substantially no porosity. The outer surface is shown in FIG. 19a FIG. 19a shows an outer surface that is dense and displaying substantially no porosity. The cross-sectional view is shown in FIG. 19b at a magnification of 200 times. FIG. 19b shows plate-like domains of polymer that were revealed during brittle facture of the film. Another cross-sectional view is shown in FIG. 19c at a magnification of 1000 times. FIG. 19C shows a dense, fibrillar morphology.

Figure 20A:
FIG. 20a-c are scanning electron photomicrographs of a film sample of Film #5.
Figure 20B:
Figure 20C:
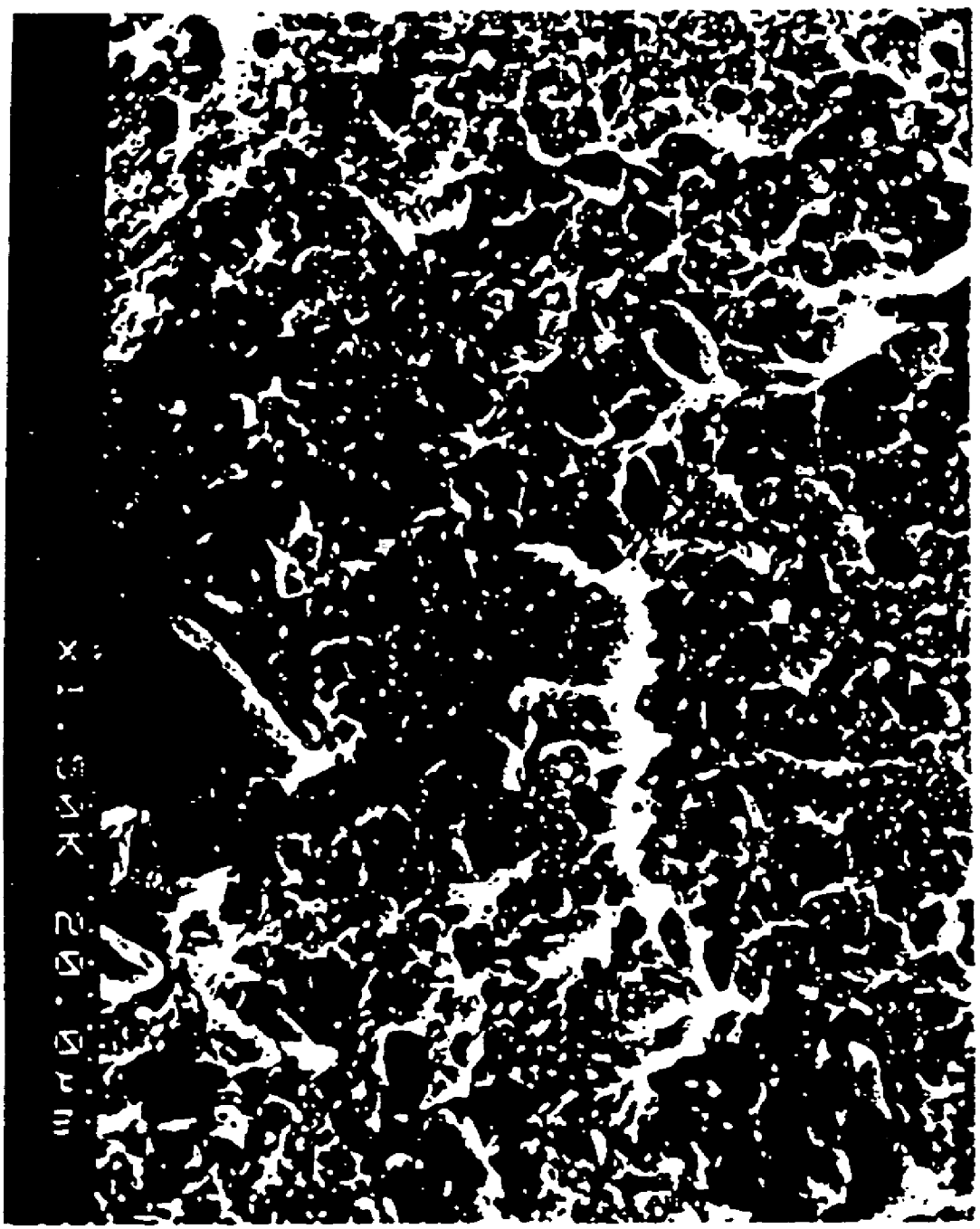

FIGS. 20a–c are scanning electron photomicrographs of film samples #5—about 88% polypropylene and 12% poly(ethylene glycol). FIGS. 20a–c illustrate that a two phase system consisting essentially of a water-insoluble polymer and hydrophilic agent has a heterogeneous morphology with dense fibrillar matrix interspersed with domains of lamellar structures, which is the poly(ethylene glycol). FIGS. 20a–c further show voids between lamellar fibrillar and fibrillar structures that are channels and are oriented in the same direction. The outer surface is shown in FIG. 20a at a magnification of 1000 times. FIG. 20a shows an outer surface that is dense and displaying substantially no porosity. The cross-sectional view is shown in FIG. 20b at a magnification of 2,500 times. FIG. 20b shows fibrillar domains of polymer coated with lamellar strands of poly(ethylene glycol). FIG. 20c is a cross-sectional view of film sample #5 fractured a perpendicular angle and at a magnification of 1,500 times. FIG. 20c shows the fibrillar polypropylene matrix interspersed with solid, amorphous cylinder of poly(ethylene glycol).

Figure 21A:
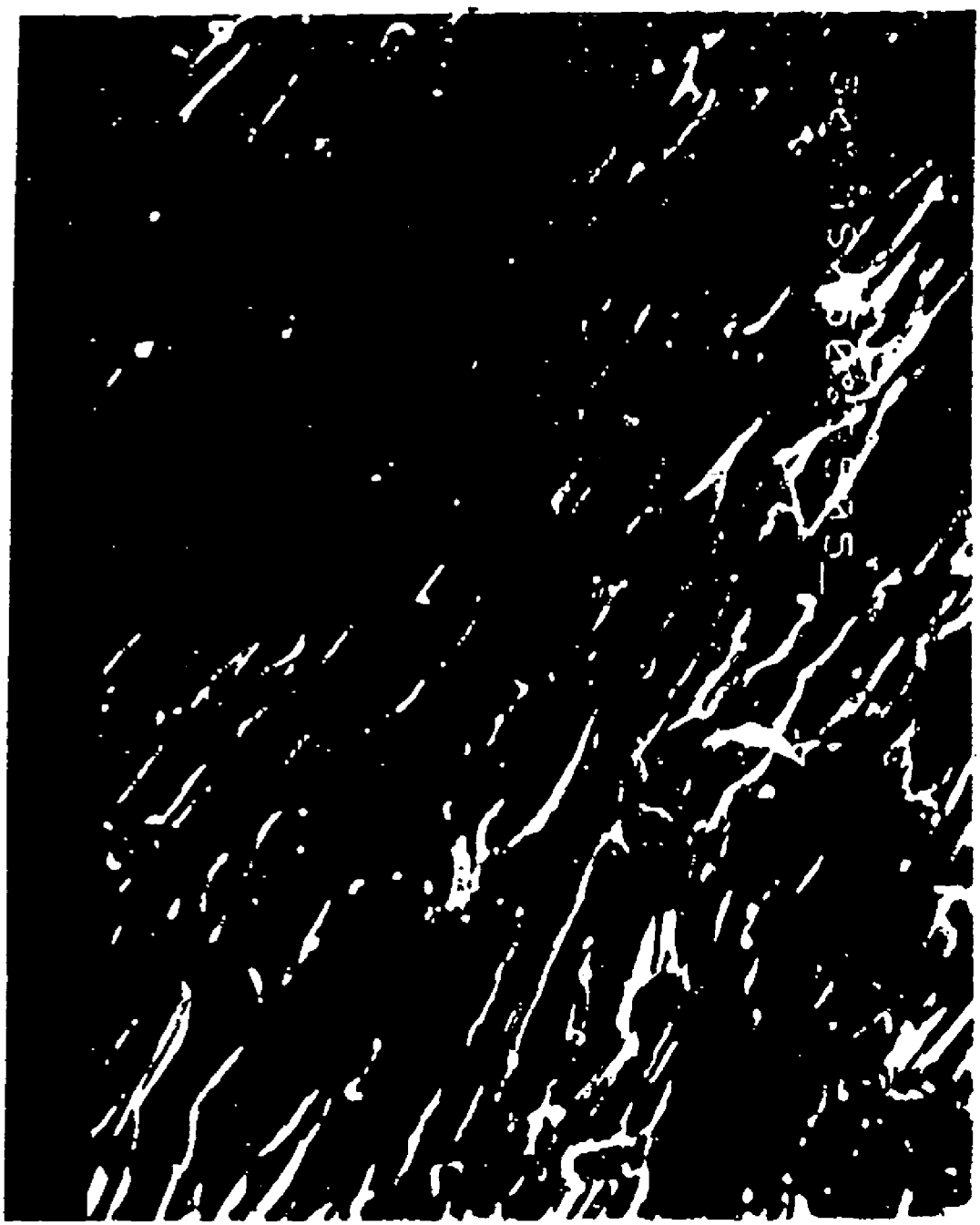
FIG. 21a-c are scanning electron photomicrographs of a film sample of Film #6.
Figure 21B:
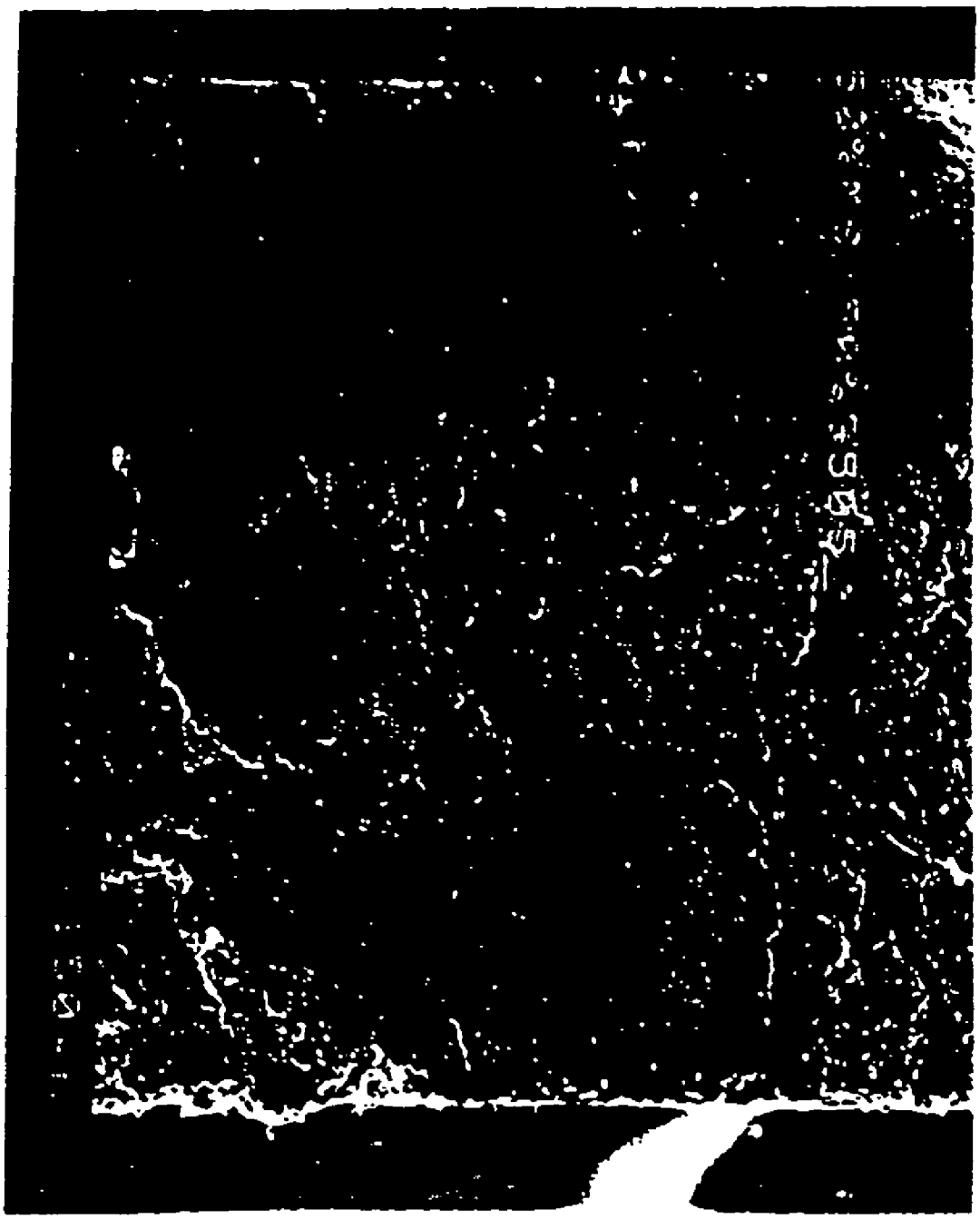
Figure 21C:
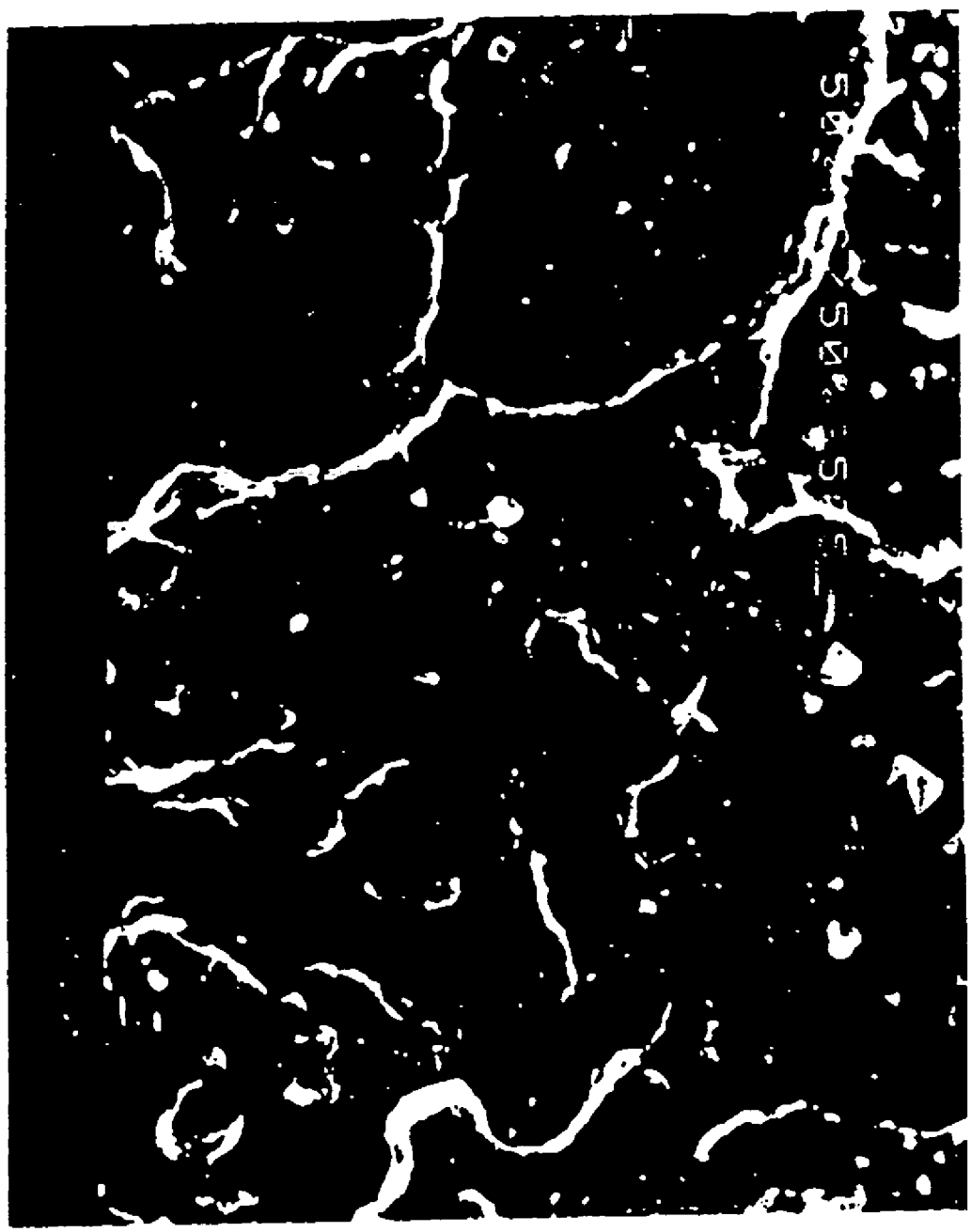

FIGS. 21a–c are scanning electron photomicrographs of film sample #6—about 50% polypropylene and 50% molecular sieve. FIGS. 21a–c illustrate a typically homogeneous dense matrix and discrete molecular sieves can only occasionally be seen and are deeply embedded in the polymer despite the high loading of molecular sieves. FIG. 21a shows the outer surface at a magnification of 1,000 times that is covered with long channels measuring 5–30 microns. The outline of the molecular sieves (1–10 microns) can be seen embedded beneath the surface of the polymer. The cross-sectional view is shown in FIG. 21b at a magnification of 200 times. FIG. 21b shows plate-like domains of polymer and a grainy appearance due to the high loading of molecular sieves. FIG. 21c is a cross-sectional view at a magnification 1,500 times and shows a dense morphology, substantially no porosity and many small particles embedded in the polymer.

FIGS. 22a–d are scanning electron photomicrographs of film samples #3—about 52% molecular sieve, about 34% polypropylene and about 12% poly(ethylene glycol).

Figure 22A:
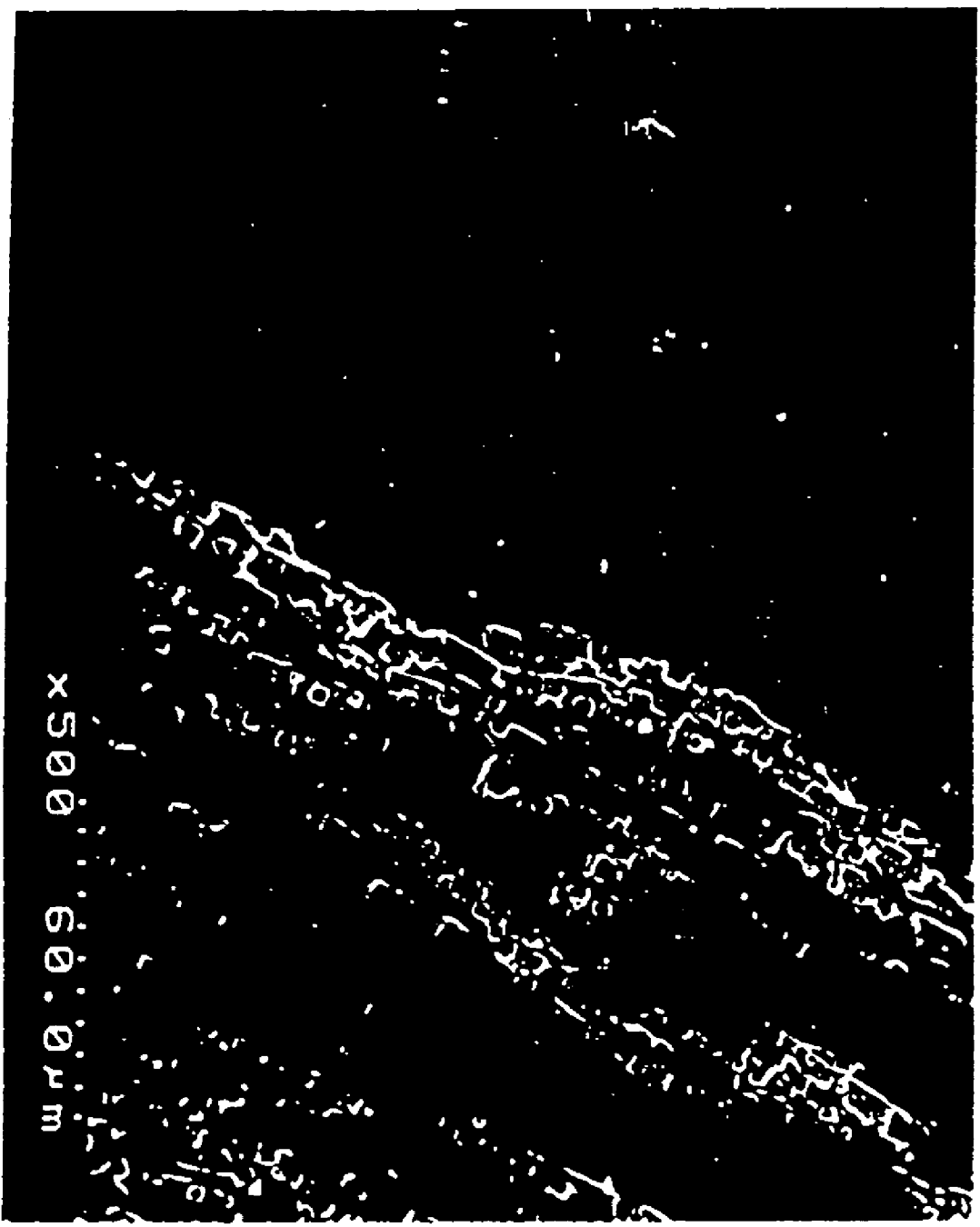
FIG. 22a-d are scanning electron photomicrographs of a film sample of Film #3.
Figure 22B:
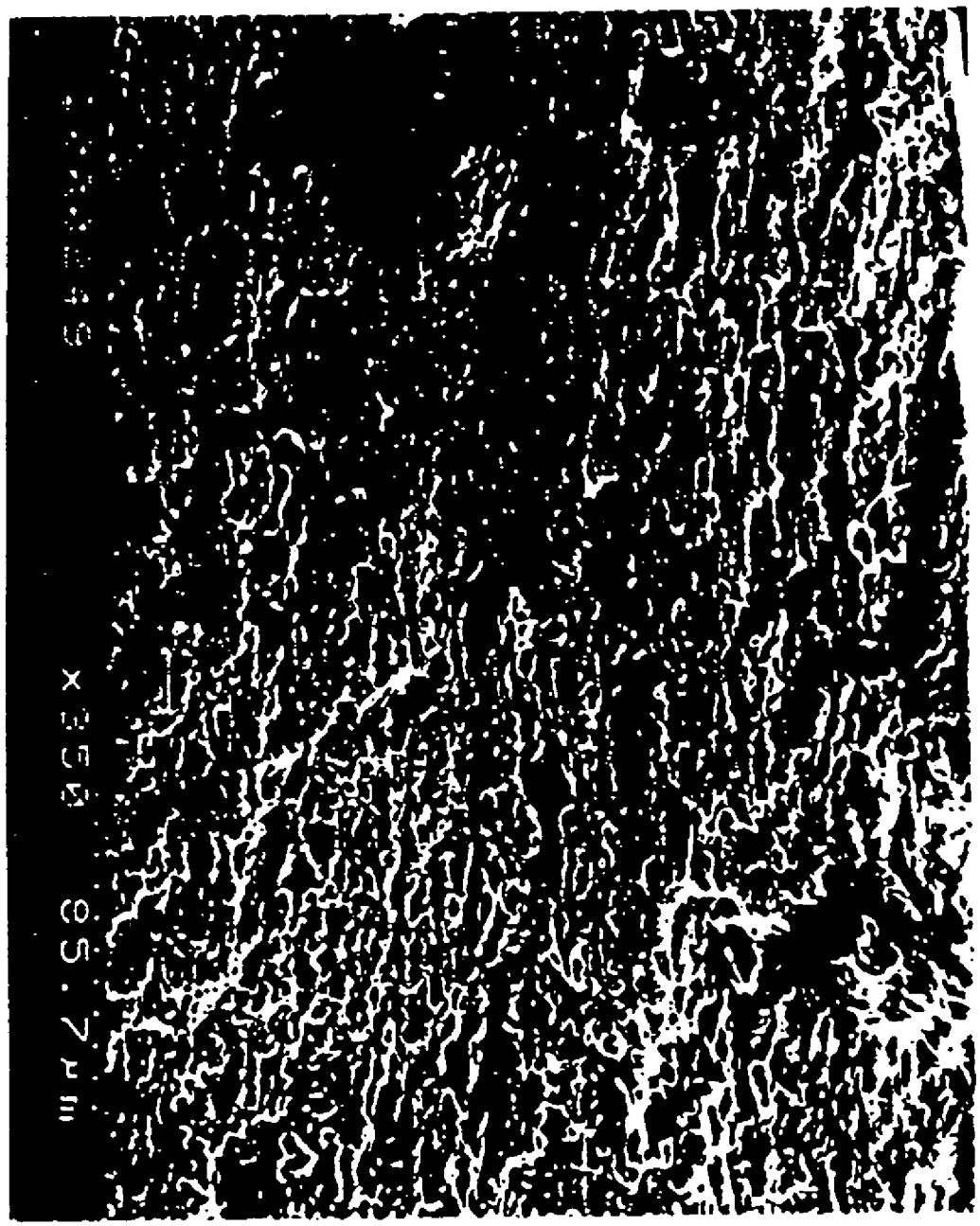
Figure 22C:
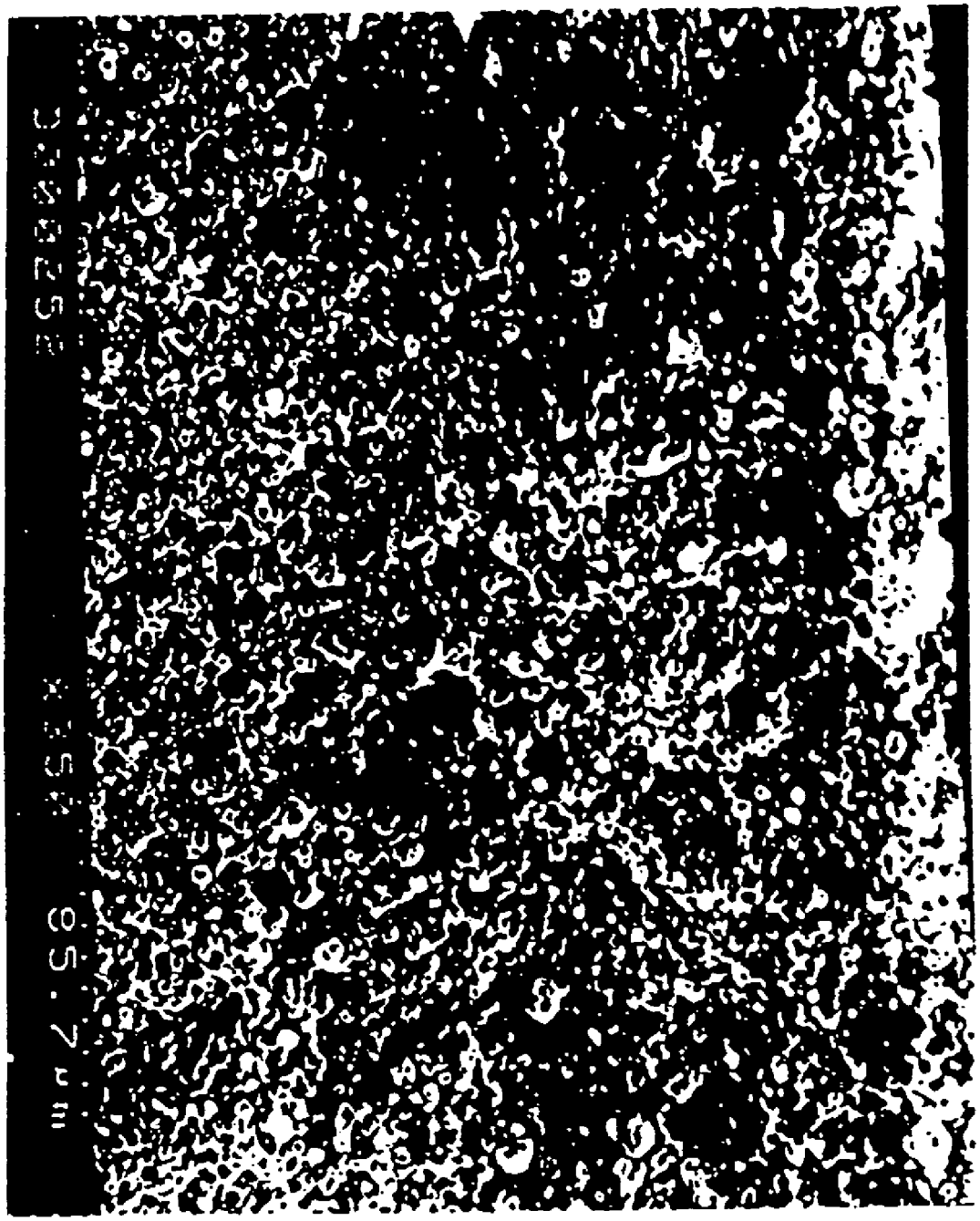
Figure 22D:

FIGS. 22a–d show a three phase system with a highly porous morphology. FIG. 22a shows the outer surface at a magnification of 500 times that is covered with long channels, measuring 5–30 microns, and that is filled with numerous discrete molecular sieve particles. A cross-sectional view is shown in FIG. 22b at a magnification of 350 times. FIG. 22b shows a very porous morphology with long channels running in the fracture orientation. FIG. 22c is a cross-sectional view in the perpendicular orientation at a magnification of 350 times and appears to show holes. FIG. 22 is at higher magnifications—1,500 times. FIG. 22d shows channels containing discrete molecular sieves as well as agglomerates of many sieves embedded in the poly(ethylene glycol). Consequently, based on FIG. 22b, it is believed that the holes seen in FIGS. 22b and 22c are locations where the molecular sieve fell out during fracture preparation for SEM.

In conclusion, Examples 1, 2 and 3 further confirm the theory for the formation of a co-continuous interconnecting channel morphology.

EXAMPLE 4

Figure 23B:
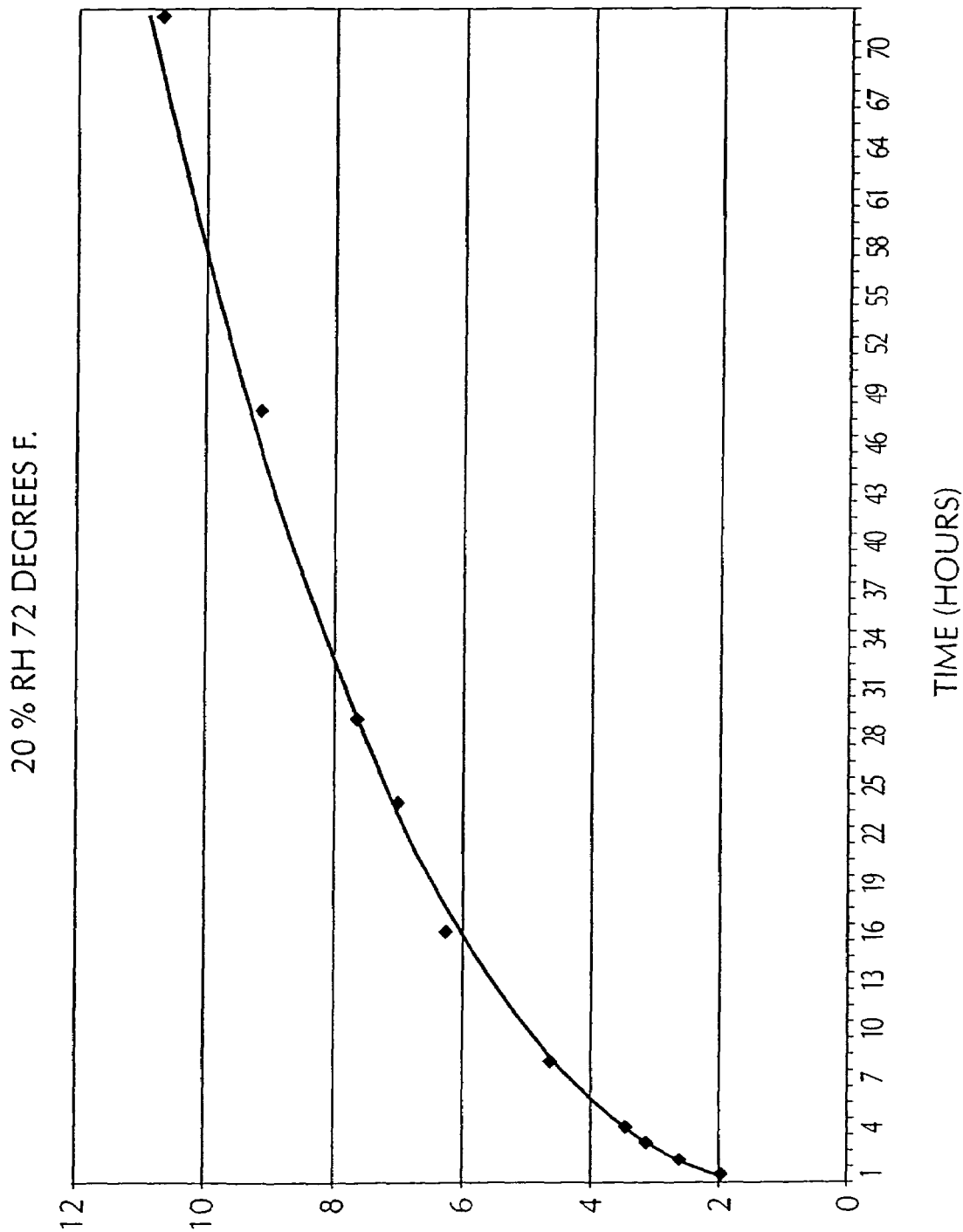

The purpose of the following example is to demonstrate the water absorption properties of the compositions of the present invention. Samples of film with similar processing conditions as film #1 were having about 50% (w/w) of molecular sieve [4 Angstrom], about 12% (w/w) poly(ethylene glycol) and about 38% (w/w) polypropylene and were evaluated for moisture adsorption of its total weight by using the following test method (a) one environmental chamber was preset for 72 F and 10% relative humidity ("Rh") and another chamber was preset for 72 F and 20% Rh; (b) the dish was weighed and the weight recorded; (c) the scale was then tared to remove the weight of the dish from the balance; (d) the film was then added to the weighed dish; (e) the material was then weighed and the weight recorded; (f) the weigh dish with the sample was placed in the environmental chamber; (g) the sample was left in the chamber for the desired time; (h) after the desired time was reached, the dish with the sample was removed, re-weighed and the weight recorded; and (i) the precent moisture gained per gram of molecular sieve was calculated by (total weight gain of sample)/(weight of molecular sieve in sample)×100. The results are presented in FIGS. 23a [10% RH] and 23b [20% Rh] The maximum theoretical precent moisture gained per weight of a 4 Angstrom molecular sieve is about 24 to 25%. FIGS. 23a and 23b demonstrate that the high transmission rate (e.g., moisture absorption rate) of the present invention.

Monolithic compositions having co-continuous interconnecting channel morphology and their constituent compounds have been described herein. As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without departing from the teachings, spirit and intended scope of the invention.

What is claimed is:

1. A composition comprising at least three components:
   a polymer base material wherein the polymer base is a thermoplastic;
   a desiccating agent;
   a channeling agent, wherein the channeling agent is a material that is melted, during processing of the composition, and is a material that forms passages throughout a polymer base material, after processing of the composition; and wherein:
   a) the affinity between the material that is the channeling agent and the desiccating agent is greater than between the polymer base material and the desiccating agent;
   b) the desiccating agent is entrained in the polymer base material;
   c) the polymer base material is a material, prior to processing of the composition, that more greatly resists diffusion of moisture than does the material that is the channeling agent;
   d) the passages transmit moisture to the entrained desiccating agent in the polymer base material; and
   e) the composition has at least three phases.

2. The composition of claim 1 wherein the amount of desiccating agent in the composition is between about 45% to about 60% by weight with respect to the polymer base material.

3. The composition of claim 3 wherein the amount of polymer base material in the composition is at least about 40% by weight with respect to the composition.

* * * * *